(12) United States Patent
Bharihoke et al.

(10) Patent No.: US 12,210,994 B2
(45) Date of Patent: Jan. 28, 2025

(54) INTELLIGENT SYSTEMS AND METHODS FOR MANAGING APPLICATION PORTFOLIOS

(71) Applicant: Accenture Global Solutions Limited, Dublin (IE)

(72) Inventors: Sandeep Bharihoke, New Delhi (IN); Kishore Kumar Sampath, Chennai (IN); Akshaya Purushothama Kadidal, Bangalore (IN); Logesh Subramani, Chennai (IN); Barun Prakash Nanda, Bangalore (IN); Shiv Chhabra, Houston, TX (US); Ganesan Ramachandran, Faridabad (IN); Andrew Lanktree, Mercer Island, WA (US); Neeraj Arora, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 330 days.

(21) Appl. No.: 17/899,280

(22) Filed: Aug. 30, 2022

(65) Prior Publication Data

US 2024/0070588 A1 Feb. 29, 2024

(51) Int. Cl.
*G06Q 10/0637* (2023.01)
*G06F 40/242* (2020.01)
*G06F 40/268* (2020.01)
*G06F 40/284* (2020.01)

(52) U.S. Cl.
CPC ..... *G06Q 10/06375* (2013.01); *G06F 40/242* (2020.01); *G06F 40/268* (2020.01); *G06F 40/284* (2020.01)

(58) Field of Classification Search
CPC ........... G06Q 10/06375; G06F 40/284; G06F 40/268; G06F 40/242
See application file for complete search history.

(56) References Cited

U.S. PATENT DOCUMENTS

| 7,921,024 B2* | 4/2011 | Hogan | G06Q 10/0639 705/7.22 |
| 2006/0101467 A1* | 5/2006 | Buco | G06F 9/5038 718/102 |
| 2022/0187847 A1* | 6/2022 | Cella | G06Q 10/06 |
| 2023/0222531 A1* | 7/2023 | Cella | G06Q 10/06375 705/7.31 |

* cited by examiner

*Primary Examiner* — Mohammad K Islam

(57) ABSTRACT

Aspects of the present disclosure provide systems, methods, and computer-readable storage media that support application portfolio management. Input data may be received that is associated with a set of applications. The input data may indicate, for each application of the set of applications, a name of the application and a description of the application. For an application of the set of applications, a functional score, a cost, and a technical score may be determined based on the name of the application, the description of the application, or a combination thereof. A disposition recommendation for the application may be determined based on the functional score, the cost, and the technical score. In some implementation, an indication of the disposition recommendation of the application may be output via a graphical user interface.

20 Claims, 10 Drawing Sheets

INTELLIGENT SYSTEMS AND METHODS FOR MANAGING APPLICATION PORTFOLIOS

TECHNICAL FIELD

The present disclosure relates generally to application portfolio management.

BACKGROUND

For almost any business, over time, a number of applications and systems used by the business grows and results in applications which are redundant, not used, fall behind in technology, or no longer provide adequate value to the business. Application Portfolio Rationalization (APR) is the act of refining a technology applications portfolio of an organization with the goal of improving efficiency, reducing complexity, and lowering the total cost of ownership (TCO). To illustrate, as applications age, a programming language may become outdated, software may no longer be supported, an application may no longer meet business needs. Accordingly, APR may be performed to enable an entity to assess its applications, analyze the portfolio health, align business goals with Information Technology (IT) assets, and make decisions to simplify the portfolio, remove redundancies, improve business value, ensure updated technology, and improve the business value delivered through the portfolio.

However, for most organizations or businesses, performing APR can be a time-consuming and labor intensive exercise that includes many challenges. For example, with respect to an application portfolio, there may be multiple sources of application data, incomplete or inconsistent data, multiple files. multiple stakeholders and owners of information, lack of standard data fields, etc. Additionally, much of the application analysis, application comparison, portfolio health analysis, and recommendations are manually performed. Accordingly, although techniques for APR are have been established, the time-intensive and manual aspects of APR discourage regular or frequent portfolio analysis as part of application portfolio management (APM).

SUMMARY

Aspects of the present disclosure provide systems, methods, apparatus, and computer-readable storage media that support processes to intelligently analyze and manage portfolios of applications. Techniques for application portfolio management described herein provide automation of one or more aspects of managing an application portfolio using artificial intelligence (AI), industry benchmarks, master data, machine learning (ML) including one or more ML models (e.g., trained models), one or more algorithms or scoring techniques, or a combination thereof. Accordingly, the techniques for application portfolio management described herein enable an application assessment to be performed, along with optional recommendations (or application disposition), in a manner that is faster and more intelligent, and more cost effective, than conventional techniques.

As described herein, a system for application portfolio management may receive input data associated with a set of applications of an entity. The input data may indicate, for each application of the set of applications, a name of the application and a description of the application. Additionally, or alternatively, the input data may indicate one or more constraints (e.g., a set of skills, a platform preference, a hosting preference, a technical debt reduction target, a portfolio size, a cloud capability. another constraint or characteristic, etc.), one or more parameters (e.g., an application name, an application description, an application type, an application status, a technology stack, a criticality, a number of tickets, etc.). In some implementations, the system may use one or more machine learning (ML) models to generate clean input data, to match an application to a capability (e.g., a business capability), or a combination thereof. To illustrate, the one or more ML models may be trained and selected for an industry, such as an industry that is associated with the set of applications. For each application of the set of applications, the system may determine a functional assessment score, a cost, a technical assessment score, or a combination thereof. Additionally, or alternatively, the system may determine a functional heatmap which indicates, for each capability of a set of capabilities, a number of applications of the set of applications associated with the capability. In some implementations, the functional assessment score, the cost, or the technical assessment score of an application may be determined based on a name of the application, a description of the application, or a combination thereof. The system may also determine a disposition recommendation, such as retire, retain, consolidate, replace, rehost, re-platform, or repackage/rearchitect, for each application. The disposition may be determined based on the functional assessment score, the cost, or the technical assessment score, the functional heatmap, or a combination thereof. In some implementations, the system may also determine or generate a plan for implementing one or more disposition recommendations. The plan may include a business plan, a disposition implementation roadmap, or a combination thereof.

Aspects disclosed herein enable application portfolio management. One or more ML models may advantageously be used to, based on an industry, clean input data, to match one or more applications to a capability, or a combination thereof. For example, the one or more ML models may normalize text from different languages, different regions, and different contexts to generate clean data that may be used to determine each of a functional assessment score, a cost, a technical assessment score, and a functional heatmap. The one or more ML models may additionally be trained based on feedback data to continually improve the one or more ML models for subsequent application portfolio management operations. The techniques described herein reduce an amount of time and the cost of performing the application portfolio management through the use of intelligent automation and ML models. Further still, the techniques may be used to simplify a portfolio by consolidating or retiring applications, recommending cloud options, or a combination thereof. Accordingly, the application portfolio management described herein automates and applies intelligent algorithms to address operational challenges of time and effort requirements of conventional application portfolio management.

In a particular aspect, a method for application portfolio management performed by one or more processors includes receiving input data associated with a set of applications. The input data indicates, for each application of the set of applications, a name of the application and a description of the application. The method also includes, for each application of the set of applications and based on the name of the application or the description of the application: determining a functional score associated with the application, determining a cost associated with the application, and determining a technical score associated with the application. The method further includes, for each application of the set of applications and based on the functional score associated with the application, the cost associated with the application, and the technical score associated with the application, determining a disposition recommendation associated with the application. The method includes, for each application of the set of applications, outputting, via a graphical user interface, an indication of the disposition recommendation associated with the application.

In another particular aspect, a system for application portfolio management includes a memory and one or more processors communicatively coupled to the memory. The one or more processors are configured to receive input data associated with a set of applications. The input data indicates, for each application of the set of applications, a name of the application and a description of the application. The one or more processors are further configured to, for each application of the set of applications and based on the name of the application or the description of the application: determine a functional score associated with the application, determine a cost associated with the application, and determine a technical score associated with the application. The one or more processor are also configured to, for each application of the set of applications and based on the functional score associated with the application, the cost associated with the application, and the technical score associated with the application, determine a disposition recommendation associated with the application. The one or more processor are also configured to, for each application of the set of applications, output, via a graphical user interface, an indication of the disposition recommendation associated with the application.

In another particular aspect, a non-transitory computer-readable storage medium stores instructions that, when executed by one or more processors, cause the one or more processors to perform operations for application portfolio management. The operations include receiving input data associated with a set of applications. The input data indicates, for each application of the set of applications, a name of the application and a description of the application. The operations also include, for each application of the set of applications and based on the name of the application or the description of the application: determining a functional score associated with the application, determining a cost associated with the application, and determining a technical score associated with the application. The operations further include, for each application of the set of applications and based on the functional score associated with the application, the cost associated with the application, and the technical score associated with the application, determining a disposition recommendation associated with the application. The operations include, for each application of the set of applications, outputting, via a graphical user interface, an indication of the disposition recommendation associated with the application.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims.

The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support application portfolio management operations. Techniques for application portfolio management described herein provide automation of one or more aspects of managing an application portfolio using AI, industry benchmarks, master data, ML techniques including one or more ML models (e.g., trained models), one or more algorithms or scoring techniques, or a combination thereof. Accordingly, the techniques for application portfolio management described herein enable an application assessment to be performed quickly and efficiently in an automated manner regardless of the size of the application portfolio. The system additionally provides for generating recommendations for application disposition in a manner that is faster and more intelligent, and more cost effective, than conventional techniques.

Figure 1:
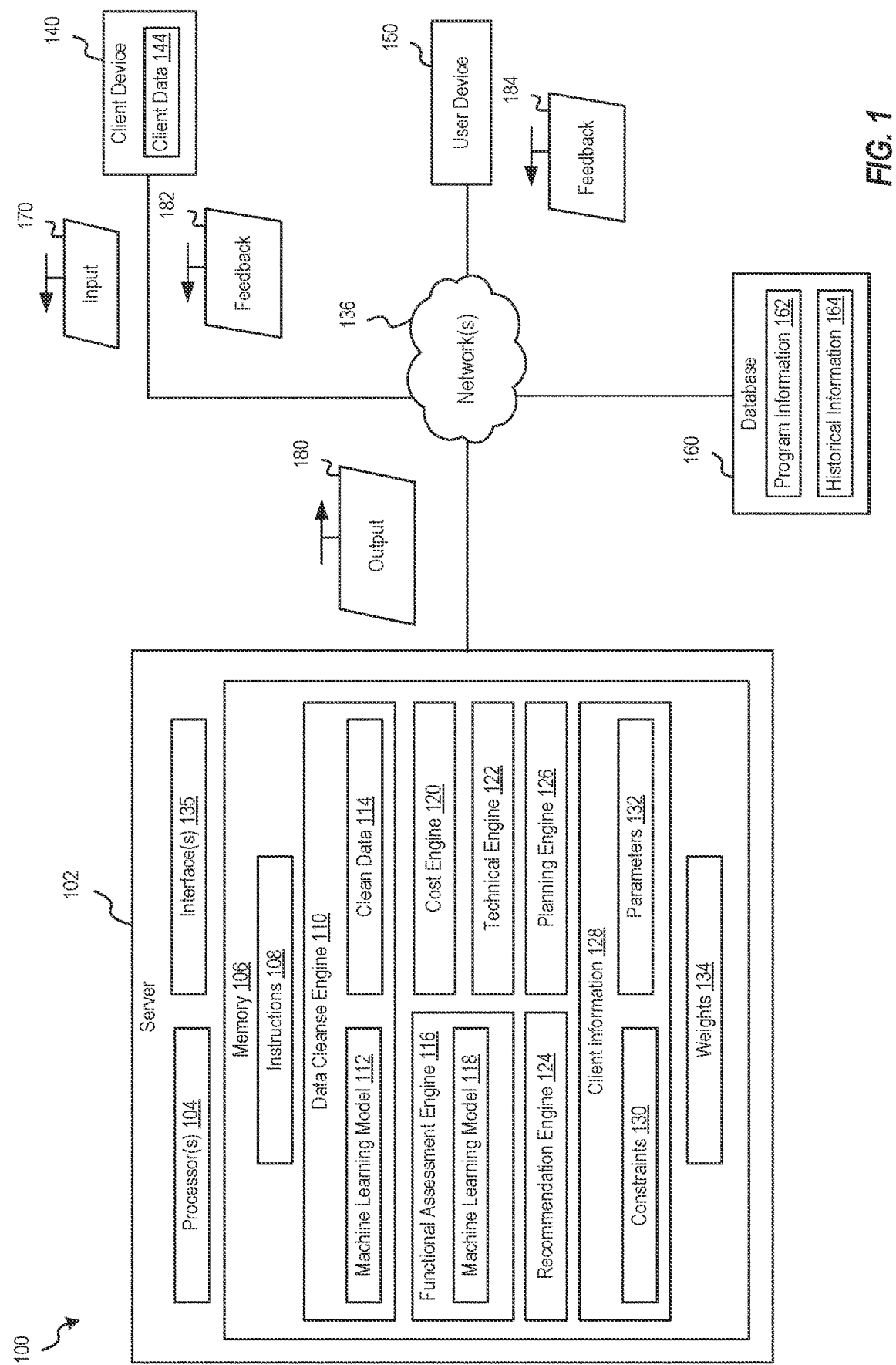
FIG. 1 is a block diagram of an example of a system that supports application portfolio management according to one or more aspects.

Referring to FIG. 1, an example of a system that supports application portfolio management according to one or more aspects is shown as a system 100. As shown in FIG. 1, the system 100 includes a server 102, one or more networks 136, a client device 140, a user device 150, and a database 160. In some implementations, the system 100 may include additional components that are not shown in FIG. 1, such as one or more client devices, additional databases or data sources, or a combination thereof, as non-limiting examples.

The server 102 may be configured to support one or more application portfolio management operations. Although described as a server, in other implementations the server 102 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The server 102 includes one or more processors 104, a memory 106, one or more communication interfaces 135. In some other implementations, one or more of the components may be optional, one or more additional components may be included in the server 102, or both. It is noted that functionalities described with reference to the server 102 are provided for purposes of illustration, rather than by way of limitation, and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based environment that is accessible over a network, such as the one of the one or more networks 136. To illustrate, one or more operations described herein with reference to the server 102 may be performed by one or more servers or a cloud-based system that communicates with one or more client, such as the client device 140, or one or more user devices, such as the user device 150.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 may be stored in the memory 106 as instructions 108 that, when executed by the one or more processors 104, cause the one or more processors 104 to perform the operations described herein with respect to the server 102, as described in more detail below.

The memory 106 may be configured to store one or more engines. The one or more engines may include a data cleanse engine 110, a functional assessment engine 116, a cost engine 120, a technical engine 122, a recommendation engine 124, a planning engine 126, or a combination thereof. Although server 102 is described as including each of the data cleanse engine 110, the functional assessment engine 116, the cost engine 120, the technical engine 122, the recommendation engine 124, and the planning engine 126, in other implementations, one or more of the data cleanse engine 110, the functional assessment engine 116, the cost engine 120, the technical engine 122, the recommendation engine 124, and the planning engine 126 may be optional and/or may not be included in server 102.

Each of the one or more engines may include or correspond to software, such as instructions (e.g., 108) that are configured to facilitate operations and functionality of the server. Each of the one or more engines may be configured to be executed by the one or more processors to cause the one or more processors 104 to perform the operations described herein. In other implementations, the one or more engines may not be stored in memory 106 and may include an application-specific integrated circuit ("ASIC"), an electronic circuit, a processor (shared, dedicated, or group) that executes one or more of software or firmware, a combinational logic circuit, and/or other suitable components that provide the described functionality.

The data cleanse engine 110 is configured to receive input data from the client device 140 and generate clean/normalized data, such as clean data 114. To clean the input data, the data cleanse engine may use one or more ML models 112 (referred to herein as ML models 112), which may be included in or accessible to the data cleanse engine 110. For example, the ML models 112 may be configured to receive input data and may be trained to perform recognition. such as recognize and standardize company names, cost labels, and capability keywords, or a combination thereof. The ML models 112 may include a single ML model or multiple ML models configured to perform the recognition. Examples of one or more operations performed by or using the data cleanse engine 110 are described further herein, at least with reference to FIGS. 3-5

The functional assessment engine 116 is configured to perform one or more operations to perform one or more matching operations to match input data received from client device 140 to known application information, such as program information 162. Such matching operations may reduce or eliminate manual matching. In some implementations, once a match is identified and/or configured, a name and/or a description of an applications may be mapped to a capability (e.g., a business capability). In some implementations, the name and/or the description of the applications may be mapped to the capability using probabilistic mapping. Additionally, or alternatively, the name and/or the description of the applications may be mapped to the capability using one or more ML models 118 (referred to herein as ML models 118), which may be included in or accessible to the functional assessment engine 116. For example, the ML models 118 may be configured to receive input data and may be trained to perform matching to a capability. One or more examples of a matching operation are described further herein at least with reference to FIGS. 6-8.

The functional assessment engine 116 may be configured to generate a functional score associated with an application. The functional score associated with the application may be determined based on one or more parameters (e.g., parameters 132) that correspond to the application. The parameters 132 may be normalized to a value between 0 to 1 and multiplied with weights 134 decided by a set of constraints 130. Accordingly, a score may be provided to each application of a set of applications, which enables different applications (associated with different capabilities) to be compared. The scoring mechanism may be resilient to missing values. For each parameter, a weighted value may be determined. For example, a first parameter weighted value (P1) may be determined as, P1=Normalized Parameter Score1*$W_1$: a second parameter weighted value (P2) may be determined as, P2=Normalized Parameter Score2*$W_2$: and an nth parameter weighted value (Pn), where n is a positive integer, may be determined as, Pn=Normalized Parameter Scoren*$W_n$. The functional score may then be determined as:

$$\text{Functional Score} = \frac{\sum_{0}^{C_2^n} \sqrt{Py^2 + Px^2}}{C_2^n}$$

Where n≠2, X and Y are every combination of scores, and $C_2^n = (n!)/2*(n-2)!$.

This scoring mechanism ensures that all scores lie within a hypersphere of radius $\sqrt{n}$, where n is the number of available parameters (note all parameters may not be available in all cases and scores need to be comparable). This scoring formula may ensure that scores are comparable as long as there is a multiple number (e.g., 3 or more) of scored parameters.

Additionally, or alternatively, a functional heatmap report may be generated at the end of functional assessment which indicates how many applications have significant functional overlapping of their capabilities, how many applications have considerable overlap of their capabilities, how many applications have a minimal functional overlapping of their capabilities, or a combination thereof. An example of a functional heatmap is described further herein at least with reference to FIG. 9.

The cost engine 120 is configured to calculate a total cost of ownership (TCO) for an application. The cost engine 120 may be configured to calculate the TCO using one or more cost calculating techniques, such as a top-down benchmark based technique, a t-shirt sizing technique, a utilization based technique, a labor breakdown technique, or an infrastructure mapping technique. In some implementations, the cost engine 120 may compare or aggregate a result of two or more cost calculating techniques to determine the TCO for an application. In some implementations, the cost of an application may be divided across one or more cost categories, such as a cloud category, a labor category, an infrastructure category, a license category, or a combination thereof. In some implementations, the cost for the application may be divided across the one or more categories based on one or more factors, such as an application type, an application size or criticality, payroll data, a datacenter cost, a data recovery cost, an industry benchmarks, or a combination thereof.

The technical engine 122 is configured to perform one or more operations to determine a technical score of an application. In some implementations, the technical engine 122 may determine a score for each of one or more technical categories, such as a technical risk category, a technical adequacy category, a cloud readiness category, or a combination thereof. In some implementations, the technical engine 122 may select one or more parameters 132 based on the application type and available data. The technical risk may be determined based on an end of life or end of support of each application, which may be determined based on data, such as the program information 162. For technical adequacy and cloud readiness, these scores may be a mix of application facts and opinion of users as provided the intake data or the program information. The scores of the one or more categories associated with an application may be combined to generate the technical score of the application.

The technical engine 122 may be configured to generate a technical score, such as for a technical category, in a similar manner as described with reference to the functional score generated by the functional assessment engine 116. For example, the technical engine 122 may normalize the parameters 132 and multiple the normalized parameters by weights 134. It is noted that one or more weight values applied to determine the technical score may be different from weight values applied to determine the functional score.

The recommendation engine 124 is configured to generate a disposition recommendation or a disposition associated with the application based on the functional score of the application, the cost of the application, the technical score of the application, or a combination thereof. Additionally, or alternatively, the disposition recommendation may be determined based on the heatmap, one or more constraints 130, or a combination thereof. Additionally, or alternatively, the disposition of an application may be determined based on historical data, such as the historical information 164. For example, the disposition recommendation associated with the application may include or indicate a disposition of retire, retain, consolidate, replace, rehost, re-platform, or repackage/rearchitect. In some implementations, the functional scores may indicate whether to consolidation one or more applications, such as when two or more programs have overlapping functional scores, such as scores within a range. Additionally or alternatively, the functional scores may indicate whether or not to enhance or replace an application, such as when an application has a lower functional score (e.g., less than or equal to a threshold) as compared to other functionally overlapping applications. An application that has a lower technical score, as compared to one or more other applications, may indicate a remediate recommendation/disposition, such as rehost, rearchitect, or replatform. For example, a low technical risk category score and/or a low cloud readiness category score may indicate a remediation recommendation/disposition. A disposition of retain or retire may be determined based on a combination of the functional score and the technical score.

In some implementations, the recommendation engine 124 may be configured to determine a disposition of an application based on historical data, such as the historical information 164. For example, historical successful application disposition for a particular industry may be scored and used as the historical information 164. In some implementations, a historical successful application disposition value may be determined for each of the possible disposition outcomes. According, the additional historical successful application disposition values combined with the applications (that each include a functional score, a cost, and a technical score) results in a [(n+6)×3] matrix, where n is the number of applications. A covariance matrix S is constructed using this standard formula:

$$S = \text{Cov}(X,Y) = \Sigma E((X-\mu)E(Y-\nu))/n-1$$

This covariance matrix is used to measure distances between each application and the distribution of points across the multiple possible dispositions using the formula $$D(Y) = \sqrt{(\bar{x} - \emptyset)^T S^{-1} (\bar{x} - \emptyset)}$$

where $\bar{x}$ is an [(n+6)×3] matrix and $\emptyset$ is the mean of these observations across functional technical and functional scores.

The distance matrix D(X) may be truncated to just 6 reference points (e.g., the candidate dispositions). The disposition may be decided based on the closest points to a particular disposition reference point.

The planning engine 126 is configured to determine a plan that may include generating a business case, a roadmap, or a combination thereof. The business case may include or indicate a cost savings or business case for of implementing the disposition. The roadmap may include a timeline, resources, costs, or a combination thereof, associated with implementation of the disposition. In some implementations, the roadmap may include a list of one or more initiatives, a priority of each initiative of the one or more initiatives, or a combination thereof. To illustrate, the planning engine 126 may be configured to use scenario modeling to determine the right business case generation scenario depending on availability of data and objectives, and create the business case for recommended initiatives. In some implementations, the planning engine 126 is configured to run a Monte-Carlo simulation that emulates the success history from previous implementations and presents best cases optimized for cost, time and other such dimensions that a user may select. Additionally, there can be constraints in using certain combinations of applications as they might be incompatible with each other or available on different cloud providers.

Additionally, the memory 106 may be configured to store data and information. For example, the memory 106 may store client information 128 and weights 134. The client information 128 may include constraints 130 and parameters 132. The constraints 130, the parameters 132, or a combination thereof, may be associated with an application or an entity, such as a client, an organization, a department, a business, etc., corresponding to client device 140. For example, the constraints may be associated with the client and may include or indicate a set of skills, a budget, a platform preference, a hosting preference, a technical debt reduction target, a portfolio size, a cloud capability, another constraint or characteristic, or a combination thereof. As another example, the parameters 132 may be associated with an application of the client. The parameters 132 may include or indicate an application name, an application description, an application type, an application status, a technology stack, a criticality, a number of tickets, or a combination thereof. In some implementations, parameters 132 may include information for multiple applications. In some implementations, one or more of the parameters 132 may be mandatory parameters. Additionally, or alternatively, one or more of the parameters 132 may be optional parameters. In some implementations, each application of a set of applications is associated with a set of parameters. To illustrate, for each application of the set of applications, the set of parameters includes a name of the application, a description of the application, a type, a status, a technical stack, a critically, a number of tickets, a language, or a combination thereof. The weights 134 may include weight values for one or more algorithms or functions, such as one or more scoring algorithms. For example, a first set of weights may correspond to functional assessment engine 116 and a second set of weights may correspond to technical engine 122. In some implementations, the weights 134 may be determined based on historical information (e.g., historical information 164), master data information generated by a technical expert, or a combination thereof.

The one or more communication interfaces 135 may be configured to communicatively couple the server 102 to the one or more networks 136 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102. In some implementations, the server 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the server 102. In some other implementations, the server 102 is communicatively coupled to one or more client devices that include or are coupled to respective display devices.

The one or more networks 136, such as a communication network, may facilitate communication of data between server 102 and other components, servers/processors, and/or devices. For example, the one or more networks 136 may also facilitate communication of data between server 102 and client device 140, user device 150, database, or any combination therefore. The one or more networks 136 may include a wired network, a wireless network, or a combination thereof. For example, the one or more networks 136 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

The client device 140 may correspond to a client, such as a business, an organization, a department, a company, etc. For example, the client device 140 may be use by or associated with an agent of the client and the client device 140 may be used to access the server 102. The client device 140 may include a computing device, such as a desktop computing device, a server, a laptop computing device, a personal computing device, a tablet computing device, a mobile device (e.g., a smart phone, a tablet, a PDA, a wearable device, or the like), a VR device, an AR device, an XR device, a vehicle (or component(s) thereof), an entertainment system, another computing devices, or a combination thereof, as non-limiting examples. Client device 140 may include a respective processor and a respective memory that stores instructions that, when executed by the processor, cause the processors to perform the operations described herein, similar to the server 102. The client device 140 also store client data 144, such as client-specific data which may be private or confidential to the respective client, and executable file packages received from the cloud service provider. Additionally, or alternatively, the client data 144 may include or correspond to one or more applications (e.g., software applications) used by the client, one or more constraints (e.g., 130) associated with the client, one or more parameters (e.g., 132) associated with the one or more applications used by the client, an industry associated with the client, or a combination thereof.

The client device may be owned, operated by, or otherwise associated with a client of an entity associated with the server 102. For example, the server 102 may be included in a cloud or cloud-based system offered by a cloud service-provider and may provide ML and AI-based technology and products to various clients to perform certain tasks, such as application portfolio rationalization or application portfolio management. Although one client device 140 is depicted in FIG. 1, in other implementations, the system 100 may include two or more client devices that are associated with the same client or with two or more distinct clients.

The user device 150 may correspond to an agent, an employee, or an administrator of an entity associated with or that owns the server 102. The user device 150 may be configured to enable an owner and/or administrator of server 102 to access and modify aspects (e.g., instructions, applications, data) of server 102. The user device 150 is configured to communicate with the server 102 via the one or more networks 136 to modify or update the client information 128 or the weights 134, to adjust or train one or more ML models (e.g., 112 or 118), to adjust or provide feedback associated with an output of one or more engines (e.g., 110, 116, 120, 122, 124, or 126), or a combination thereof. Additionally, or alternatively, the user device 150 may be configured to access the database 160. For example, the user device 150 may access the database 160 to read or receive data from the database 160, add or update data at the database 160, or a combination thereof.

The user device 150 may include a computing device, such as a desktop computing device, a server, a laptop computing device, a personal computing device, a tablet computing device, a mobile devices (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. The user devices 150 may include a processor and a memory that stores instructions that, when executed by the processor, cause the processors to perform the operations described herein, similar to the server 102. The user device 150 may also store or have access to client-specific data, such as client data 144, client information 128, or a combination thereof.

The database 160 may include one or more databases, or other storage devices. configured to maintain and provide access to stored data. In some implementations, the database 160 may include a processor and a memory that stores instructions that, when executed by the processor, cause the processors to perform the operations described herein. The database 160 may be configured to store data (e.g., information), such as program information 162 (e.g., application information), historical information 164, or a combination thereof. The program information 162 may include information associated with one or more applications. The information for each of the one or more applications may be mapped to at least one capability, at least one industry, or a combination thereof. Additionally, or alternatively, the information for at least one application may include technical specifications of the application, an application name, an application description, an application type, a manufacture, a most recent version, or a combination thereof. The historical information 164 may include benchmark inputs associated with a cost of an application. historical recommendations for an application based on an application portfolio rationalization, or a combination thereof. In some implementations, the benchmark inputs associated with the cost of the application may include a purchase price, a license cost/fee, a service agreement fee, a maintenance cost, a number of employees to maintain or support the application, an infrastructure/equipment cost for hosting the application, a cloud cost associated with the application, or a combination thereof. Additionally, or alternatively, the database 160 may be configured to store client information 128, such as the constraints 130, the parameters 132, or a combination thereof, or weights 134.

During operation, the server 102 may perform one or more operations associated with application portfolio management. In some implementations, the one or more operations associated with the application portfolio management may include or correspond to a process or stages as described with reference to FIG. 2.

The server 102 may receive an input 170 from the client device 140. The input 170 may include or indicate at least a portion of the client data 144. In some implementations, the input 170 indicates a set of applications of an entity associated with client device 140. For example, the input 170 may indicate, for each application of the set of applications, a name of the application, a description of the application, or a combination thereof. Additionally, or alternatively, the input 170 may include or indicate, for each application of the set of applications, a set of parameters that includes the name of the application, the description of the application, a type of the application, an application status, a technology stack, a criticality, a number of tickets, or a combination thereof. Additionally, or alternatively, the input 170 may include or indicate is a set of constraints. The set of constraints may include a skill, a budget, a platform preference, a hosting preference, a technical debt reduction target, a portfolio size target, or a combination thereof. In some implementations, the input 170 may include or indicate an industry associated with the set of applications, the entity, or a combination thereof.

In some implementations, the server 102 may receive the input 170 and store input data included in or indicated by the input 170. For example, the server 102 may store the input data at the memory 106. To illustrate, the server 102 may store the input data as part of the client information 128, the constraints 130, the parameters 132, or a combination thereof. Additionally, or alternatively, the server 102 may clean the input data to generate clean data 114. The server 102 may store the clean data 114 at memory 106, such as, as part of part of the client information 128, the constraints 130, the parameters 132, or a combination thereof.

In some implementations, the server 102 may clean the input data using the data cleanse engine 110. As an illustrative, non-limiting example, server 102 may select, based on an industry, one or more ML models of a plurality of ML models. The one or more ML models may include the machine learning model 112. Each ML model of the one or more ML models trained to recognize and standardize company names, cost labels, and capability keywords, or a combination thereof. The server 102 may clean the input data using the one or more ML models (e.g., 112) to generate the clean data 114. To illustrate, the server 102 may perform one or more matching operations based on the input data and a context dictionary associated with the industry. The server 102 may generate one or more clusters based on the one or more matching operations and generate the clean data 114 based on the one or more clusters.

In some implementations, the process of cleaning the input data, use of the context dictionary, or a combination thereof may generate a candidate set of words, terms, or phrases to be added to the context dictionary or to be used to further train the one or more ML models (e.g., 112). In such implementations, the candidate set may be communicated to the user device 150 so that a user of the user device 150 can review the candidate set. The user may identify one or more of the words, terms, or phrases to be added to the context dictionary or used to further train the one or more ML models (e.g., 112). The user device 150 may transmit feedback 184 to the server 102 that includes or indicates the one or more words, terms, or phrases identified by the user.

In some implementations, the server 102 may determine, based on the clean data 114, one or more entities. The one or more entities may include a vendor name, a capability, a cost, a disposition, an application, or a combination thereof. In some implementations, the server may determine the one or more entities based on the clean data 114 and a machine learning model trained to recognize entities, cost labels, capability keywords, or a combination thereof.

The server 102 may perform one or more operations associated with APM based on the input 170, the input data, the clean data 114, or a combination thereof. For example, for at least one application of the set of applications, the server 102 may determine a functional score associated with the application, a technical score associated with the application, a cost associated with the application, a disposition recommendation associated with the application, or a combination thereof. In some implementations, for the at least one application, the server 102 may determine the functional score, the technical score, the cost, or the disposition recommendation based on the name of the application, the description of the application, the industry, one or more constraints 130, one or more parameters 132, or a combination thereof.

The server 102 may determine the functional score associated with the application using the functional assessment engine 116. As an illustrative, non-limiting example, the server 102 may determine the functional score associated with the application based on the name of the application, the description of the application, one or more parameters (e.g., 132) of the applications, or a combination thereof. In some implementations, a functional score for an application may be determined based on a set of parameters (e.g., 132) associated with the application. To illustrate, each parameter may be normalized and multiplied by a corresponding weight (e.g., 134), and the products may be combined to determine a functional score. It is noted that one or more different techniques may be used to combine the products to determine the functional score. Additionally, or alternatively, the functional score associated with the application may be determined based on a strategic fit of the application, a functional adequacy of the application, a future potential of the application, or a combination thereof.

In some implementations, the server 102 may map the application to a capability of a set of capabilities associated with an industry. For example, the server 102 may attempt to map the application to the capability using the functional assessment engine 116. In some implementations, the server 102 may attempt to map each application of a set of applications to a corresponding capability. To illustrate, for each application of the set of applications, the server 102 may determine whether or not the application is mappable to a capability of a set of capabilities associated with the industry. If an application is mappable, the server 102 maps the application to a capability. However, if the server 102 determines that at least one application of the set of applications is unmappable, the server 102 may request additional information associated with the at least one application. For example, the server 102 may send a request for the additional information to the client device 140. The server 102 may receive a response to the request and the response may include the additional information, such as information associated with one or more parameters of the application. The server 102 may map the at least on application to a capability based on the additional information. Additionally, or alternatively, if the server 102 determines that at least one application of the set of applications is unmappable, the server 102 may use machine learning model 118 to determine one or more parameters for the at least one application.

In some implementations, based on the mappings of the set of applications to a set of capabilities, the server 102 may generate heatmap data. The heatmap data may indicating, for each capability of the set of capabilities, a number of applications of the set of applications associated with the capability. The server 102 may generate and/or output a representation of the heatmap data. For example, the representation may be output to the client device 140. In some implementations, data associated with the representation may be included in an output, such as output 180, transmitted by the server 102.

The server 102 may determine the cost associated with an application using the cost engine 120. As an illustrative, non-limiting example, server 102 may determine the cost associated with the application based on the name of the application, the description of the application, or a combination thereof. In some implementations, to determine the cost of the application, the server 102 may select one or more calculation processes from multiple calculation processes (e.g., multiple calculation techniques). For each of the one or more calculations processes, the server 102 may determine a candidate cost. The server 102 may aggregate the determined one or more candidate costs of the one or more calculation processes to determine the cost of the application. In some implementations, the cost associated with the application includes a cloud cost, a labor cost, an infrastructure cost, a license cost, or a combination thereof. For example, an aggregated cost of the application may be apportioned between the cloud cost, the labor cost, the infrastructure cost, the license cost, or a combination thereof.

The server 102 may determine the technical score associated with the application using the technical engine 122. As an illustrative, non-limiting example, the server 102 may determine the technical score associated with the application based on the name of the application, the description of the application, one or more parameters (e.g., 132) of the applications, or a combination thereof. In some implementations, the technical score for the application may be determined based on a set of parameters (e.g., 132) associated with the application. To illustrate, each parameter may be normalized and multiplied by a corresponding weight (e.g., 134), and the products may be combined to determine a technical score. It is noted that one or more different techniques may be used to combine the products to determine the technical score. Additionally, or alternatively, the technical score associated with the application may be determined based on a type, a technical risk, a cloud readiness, a technical adequacy, an operating system, or a combination thereof.

The server 102 may determine a disposition recommendation associated with an application using the recommendation engine 124. As an illustrative, non-limiting example, server 102 may determine the disposition recommendation associated with the application based on the functional score of the application, the cost of the application, the technical score of the application, or a combination thereof. Additionally, or alternatively, the disposition recommendation may be determined based on the heatmap, one or more constraints 130, or a combination thereof. For example, the disposition recommendation associated with the application may include or indicate a disposition of retire, retain, consolidate, replace, rehost, re-platform, or repackage/rearchitect.

The server 102 may output an indication of the disposition recommendation associated with the application. For example, the server may generate and transmit output 180 that includes or indicates the disposition recommendation (e.g., the indication). The output 180 may be transmitted to the client device 140, the user device 150, or a combination thereof. In some implementations, the server 102 may output the indication via a graphical user interface.

In some implementations, server 102 may receive recommendation feedback, such as feedback 182, based on the disposition recommendation of the application. For example, a user of client device 140 may review the disposition recommendation of the application and transmit the feedback 182 to the server 102. The feedback may include or indicate a change in the disposition recommendation. The server may receive the feedback 182 and, based on the feedback 182, generate an updated disposition recommendation associated with the application. For example, the server 102 may use the recommendation engine 124 to generate the updated disposition recommendation.

In some implementations, the server 102 may generate a plan for implementing one or more disposition recommendations, one or more updated disposition recommendations, or a combination thereof. For example, the server 102 may generate the plan using the planning engine 126. The server 102 may generate an output, such as the output 180, that includes or indicates the plan.

As described above, the system 100 supports an application portfolio management. For example, the system 100 may provide assisted data mapping for input data that identifies required data fields from the unput data and maps it to intake data fields, such as parameters 132. The system 100 provides users with an option to review the mapping and make changes as desired. The system 100 may also use clean input data which has been cleaned using one or more ML models that are trained per industry to find and replace appropriate synonyms and to recognize and standardize company names/cost labels and capability keywords. The system 100 also uses one or more ML models to applications based on descriptions by using a combination of traditional techniques with word to vectorization, word movers' distance, fuzzy matching, universal sentence encoding, and a meta learner to incorporate user feedback. In some implementations, the system 100 utilizes multiple algorithms to make a determination, where different algorithms produce better results than others depending on the circumstances A scoring technique is used to normalize results across algorithms, and identify and present the best results dynamically based on the situation. Additionally, or alternatively, the system 100 may utilize multiple techniques to determine a cost of an application, making the cost estimation of an application more robust than conventional techniques. The system 100 may also be configured to provide replacement candidates (including SaaS options) for applications. For example, the system may execute an algorithm that checks the application name and the business capabilities it is fulfilling, and generates a custom semantic knowledge graph of applications, capabilities, and strategic intents. A possible replacement application is selected based on the semantic knowledge graph and the graph may optionally be provided to a user for review and feedback. The system 100 may also generate a business case for a final recommendation and/or a roadmap for implementation of the final recommendation. The system 100 may run a Monte-Carlo simulation that emulates the success history from previous implementations and presents best cases optimized for cost, time and other such dimensions that a user may select.

Figure 2:
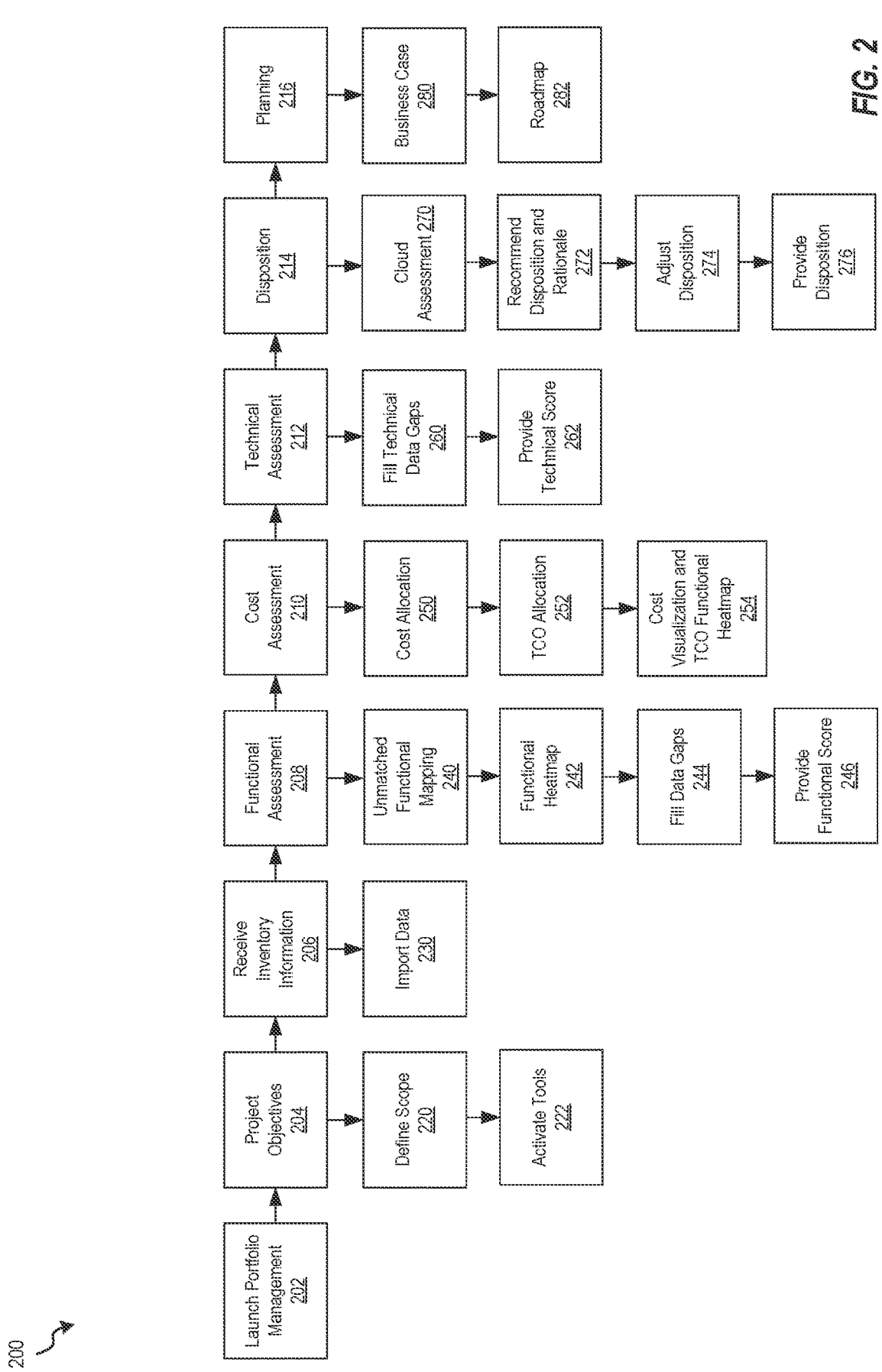
FIG. 2 shows an example of a process that supports application portfolio management according to one or more aspects.

Referring to FIG. 2, an example of a process that supports application portfolio management according to one or more aspects is shown as process 200. The process 200 may performed by server 102, processor 104, one or more engines, or a combination thereof. The one or more engines may include or correspond to the data cleanse engine 110, the functional assessment engine 116, the cost engine 120, the technical engine 122, the recommendation engine 124, the planning engine 126, or a combination thereof.

The process 200 may include, at 202, launching a portfolio management application, such as application portfolio management software. The process 200 may also including, at 204, determining project objectives. The project objectives may be received from or defined by an entity that desires to preform application portfolio management Determining project objectives may include, at 220, defining a scope of the application portfolio management task and, at 222, activating one or more tools. In some implementations, data that indicates or defines the scope may be included in or indicated by the input 170. For example, the scope may indicate if one or more applications should be moved to the cloud, priorities of function, cost, and/or technical capabilities, a timeframe, a budget, a portfolio size target, or a combination thereof. The one or more tools may include the data cleanse engine 110, the functional assessment engine 116, the cost engine 120, the technical engine 122, the recommendation engine 124, the planning engine, or a combination thereof.

The process 200 may include, at 206, receiving inventory information. Receiving the inventory information may include, at 230, importing data. The imported data may include or correspond to the client data 144, data included or indicated by the input 170, the clean data 114, the client information 128, the constraints 130, the parameters 132, or a combination thereof. In some implementations, receiving the inventory information may be performed by the server 102. the processor 104, the data cleanse engine 110, or a combination thereof.

The process 200 may include, at 208, performing a functional assessment. In some implementations, the functional assessment may be performed by the functional assessment engine 116. Performing the functional assessment may include performing unmatched functional mapping at 240, generating a functional heatmap at 242, filling data gaps at 244, providing a functional score at 246, or a combination thereof. Performing unmatched functional mapping may identify one or more capabilities of an application that was not matched to a known application. To illustrate, the process 200 may use a mapping algorithm to match an application to one or more known data fields. For example, the mapping algorithm may uses the name and description of the applications for probabilistic mapping to the business capability. The mapping algorithm may help to avoid or prevent manual matching. In some implementations, a result of the mapping may be provided to the entity and the entity has the option to accept or modify the mapping. However, in some situations, the mapping algorithm may not be able to match an application and additional information may be needed and/or an additional algorithm may perform. The functional heatmap may indicate, based on one or more capabilities, how many applications have significant functional overlapping, considerable functional overlap, minimal functional overlapping on the capabilities, or a combination thereof, as described further herein with reference to FIG. 9. Filling in the data gaps may include requesting feedback from an entity, such as a client associated with client device 140, or a user, such as a user of user device 150. Based on a request for feedback, the client device 140 may provide the feedback 182 or the user device 150 may provide the feedback 184 that provides additional information about an applications, such as one or more parameters (e.g., 132) associated with the application. The functional score may be generated as described with reference to the functional assessment engine 116. In some implementations, the one or more weights 134, the parameters 132, or a combination thereof may be used to determine the functional score for an application. Additionally, or alternatively, weight values for one or more weights (e.g., 134) to be applied to different parameters are determined based on data availability of a set of parameters.

The process 200 may include, at 210, performing a cost assessment. In some implementations, the cost assessment may be performed by or using the cost engine 120. Performing the cost assessment may include determining a cost allocation of an application at 250. determining a total cost of ownership (TCO) at 252, providing a cost visualization or TCO functional heatmap at 254, or a combination thereof. To calculate the TCO, one or more cost calculation techniques may be used. The one or more cost calculation techniques may include Top-Down benchmark based, t-shirt sizing, utilization based, labor breakdown, infrastructure mapping, or a combination thereof. In some implementations, the entity may indicate which cost calculation technique(s) are to be used as part of defining the scope at 220. When multiple cost calculation techniques are used, the results of the multiple cost calculation techniques may be aggregated (e.g., averaged) to determine the TCO. The cost allocation of an application may include determining a cost of an application associated with a cloud cost, a labor cost, an infrastructure cost, a license cost, or a combination thereof. The different costs (e.g., cloud, labor, infrastructure, or license) may be determined based on one or more factors, such as application type, application size or criticality, payroll data, datacenter and/or data recovery costs, industry benchmarks, or a combination thereof. The TCO may include a TCO of an application, a TCO of a set of application, a TCO of a subset (e.g., a category) of the set of application, or a combination thereof. The a cost visualization or the TCO functional heatmap may include one or more visual representations of the TCO allocation. The one or more visual representations may include a graph, a chart, a table, a heatmap, or a combination thereof. An output of the cost visualization or the TCO functional heatmap may be included in or indicated by the output 180. In some implementations, the entity may review and approve or modify the cost allocations/TCO for one or more applications.

The process 200 may include, at 210, performing a technical assessment. In some implementations, the technical assessment may be performed by or using the technical engine 122. Performing the technical assessment may include filling technical data gaps at 260. providing a technical score at 262, or a combination thereof. Filling in the technical data gaps may include requesting feedback from an entity, such as a client associated with client device 140, or a user, such as a user of user device 150. Based on a request for feedback, the client device 140 may provide the feedback 182 or the user device 150 may provide the feedback 184 that provides additional information about an applications, such as one or more parameters (e.g., 132) associated with the application. The technical score may be generated as described with reference to the technical engine 122. In some implementations, the one or more weights 134, the parameters 132, or a combination thereof may be used to determine the technical score for an application.

In some implementations, to determine the technical score, the process 200 is configured to analyzing each application based on a set of parameters (e.g., 132) associated with the application. The application is analyzed to determine one or more scores. For example, the application may be analyzed to determine a score for each of one or more technical categories. The technical categories may include a technical risk, a technical adequacy, a cloud readiness, or a combination thereof, as illustrative, non-limiting examples. The technical risk may be determined based on an end of life or end of support of each application, which may be determined based on data, such as the program information 162.

Different parameters (e.g., 132) may be used to determine a score depending on the technical category, the application type, available data, or a combination thereof. In some implementations, weight values for one or more weights (e.g., 134) to be applied to different parameters are determined based on data availability of a set of parameters. When multiple technical categories are used, the scores of the multiple technical categories may be aggregated (E.g., added) to determine a technical score of an application.

The process 200 may include, at 210, determining a disposition. In some implementations, the disposition may be performed by or using the recommendation engine 124. Determining the disposition may include performing a cloud assessment at 270, providing a recommended disposition and rationale at 272, adjusting the disposition at 274, and providing the disposition at 276, or a combination thereof.

Performing the cloud assessment may include determining a cloud readiness (e.g., moving software to the cloud) of the entity or of one or more application. In some implementations, the disposition may be determined from multiple disposition states, such as retain, refactor, rehost, replace, replatform, or retire. The disposition of an application may be determined based on the functional score, the functional heatmap, the cost, technical score, the cloud readiness determination, or a combination thereof. Additionally, or alternatively, the disposition of an application may be determined based on historical data, such as the historical information 164. In some implementations, the functional scores may indicate whether to consolidation one or more applications, such as when two or more programs have overlapping functional scores, such as scores within a range. Additionally or alternatively, the functional scores may indicate whether or not to enhance or replace an application, such as when an application has a lower functional score (e.g., less than or equal to a threshold) as compared to other functionally overlapping applications. An application that has a lower technical score, as compared to one or more other applications, may indicate a remediate recommendation/disposition, such as rehost, rearchitect, or replatform. For example, a low technical risk category score and/or a low cloud readiness category score may indicate a remediation recommendation/disposition. A disposition of retain or retire may be determined based on a combination of the functional score and the technical score. The recommendation of the disposition, and a rationale of the recommended disposition, may be performed as described with reference to the recommendation engine 124. The recommendation may be included in or indicated by an output, such as the output 180.

In some implementations, feedback may be received from an entity, such as a client associated with client device 140, or a user, such as a user of user device 150. The feedback may include or correspond to the feedback 182 from the client device 140 or the feedback 184 from the user device 150. The feedback may indicate whether or not the entity agrees or disagrees with a recommended disposition of an application. In some implementations, the recommended disposition, at 272, may be adjusted, at 274, based on the feedback received from the entity. After the adjustment of the disposition, the disposition may be provided and/or output. In some implementations, the disposition may be included in or indicated by the output 180.

The process 200 may include, at 210, determining a plan. In some implementations, determining the plan may performed by or using the planning engine 126. Determining the plan may include generating a business case at 280, generating a roadmap at 282, or a combination thereof. The business case may include or indicate a cost savings or business case for of implementing the disposition. The roadmap may include a timeline, resources, costs, or a combination thereof, associated with implementation of the disposition. In some implementations, the roadmap may include a list of one or more initiatives, a priority of each initiative of the one or more initiatives, or a combination thereof.

Figure 3:
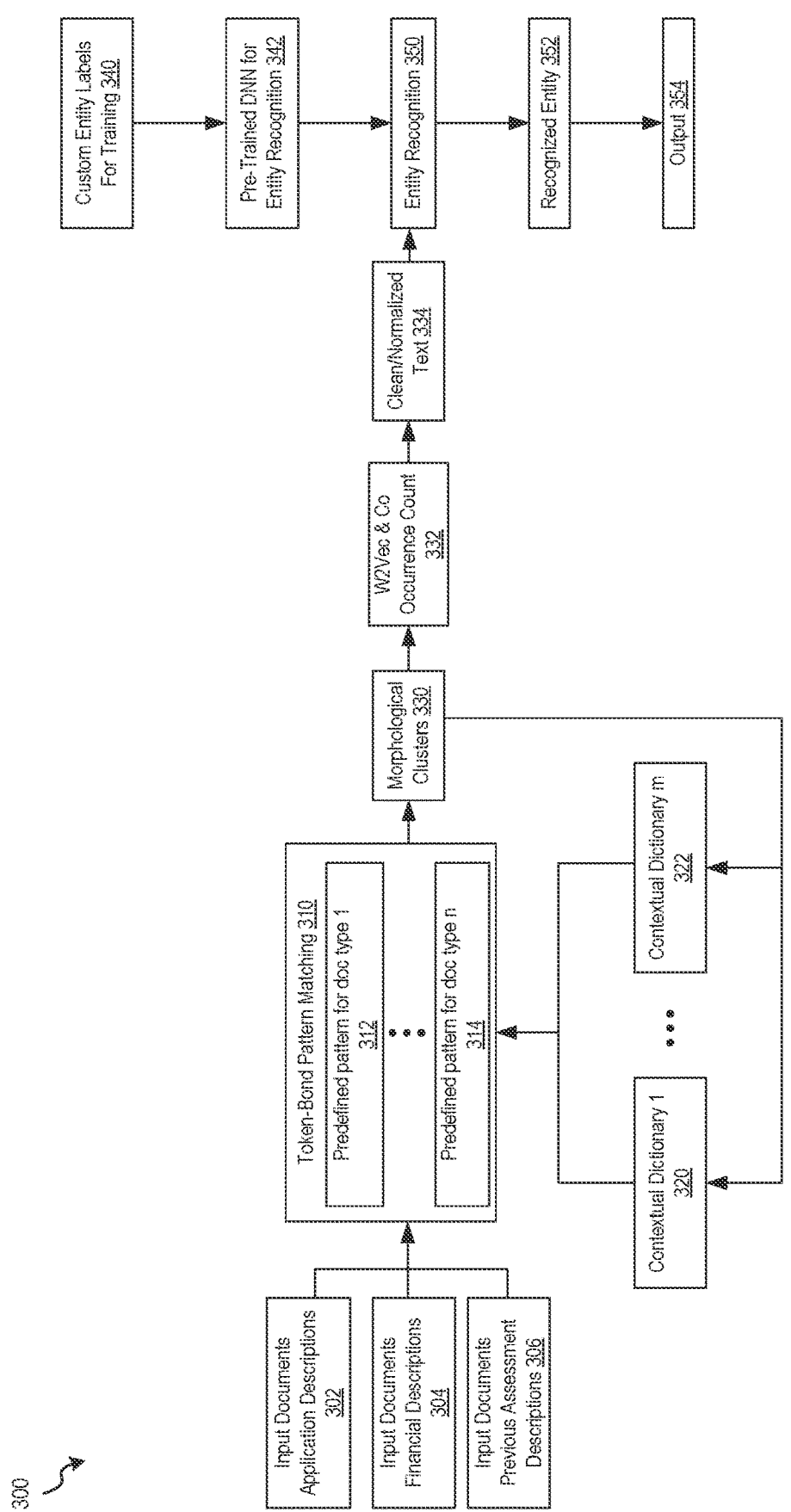
FIG. 3 is a flow diagram illustrating an example of a method for a data cleanse operation according to one or more aspects.

Referring to FIG. 3, an example of a method 300 for a data cleanse operation according to one or more aspects. The method 300 may be performed by the server 102, the processor 104, the data cleanse engine 110, or a combination thereof. Additionally, or alternatively, the method 300 may include or correspond to receiving inventory information, at 206 of the process 200, importing data at 230 of the process 200, or a combination thereof.

The method 300 includes receiving input data, such as one or more input documents. The input data may include or correspond to the client information 128, the constraints 130, the parameters 132, the client data 144, the input 170, or a combination thereof. Receiving the input data may include receiving application documents at 302, financial descriptions at 304, previous assessment descriptions at 306, or a combination thereof. It is noted that the received input data is not clean or standardized and may be received from multiple sources, in multiple formats, in multiple languages, or a combination thereof.

The method 300 may perform pattern matching, such as a token-bond pattern matching, at 310. For example, that pattern matching may be performed using one or more predefined patterns, such as a first predefined pattern for a first document type 312 or an nth predefined pattern for an nth document type 314, where n is a positive integer. Additionally, or alternatively, that pattern matching may be performed using or based on one or more contextual dictionaries, such as a first contextual dictionary 320 or an mth contextual dictionary, where m is a positive integer. In some implementations, at least one of the contextual dictionaries may be associated with an industry.

The method 300 may generate, based on the pattern matching, one or more morphological clusters at 330. The pattern matching, such as token pattern sequence detection, may be part of a pre-cleaning operation. It is noted that unsupervised and language-agonistic text normalization may use lexical and contextual similarities between tokens from a custom corpus. In some implementations, at least one of the one or more morphological clusters may be provided to the one or more contextual dictionaries to further grow and expand the one or more contextual dictionaries.

The method 300 may perform word to vectorization and co-occurrence counts at 332. Word vectors and co-occurrence counts will be used to find similarities between the corpus for a given context. The method 300 may generate, based on the word to vectorization and the co-occurrence counts, clean/normalized text at 334. The clean/normalized text may include or correspond to the clean data 114.

The method 300 may include identifying custom labels for training a model at 340. The custom entity labels may include or correspond to historical information 164. The method 300 may include pretraining a deep neural network (DNN) for entity recognition at 342. For example, the DNN may be trained to recognize and standardize company names, cost labels, or capability keywords in the context of an application. The DNN may include or correspond to the ML model 112. The entity may be an organization, company, vendor, or producer of an application of a set of applications.

The method 300 may include performing entity recognition at 350. The entity recognition may be performed based on the clean/normalized text and using the pre-trained DNN. Based on the entity recognition, an entity may be recognized at 352. The identified entity may include an entity may include or indicate a vendor name, a capability, a cost, a description, or a combination thereof. An indication of the entity may be output at 354. In some implementations, the output at 354 may include or correspond to the output 180.

As described with reference to the method 300, clean/normalized text associated with an application may be generated based on an input and ML may be used to identify an entity based on the clean/normalized text associated with the application. Using the method 300. cleaning and/or normalizing data is standardized such that the clean data may be used to make decisions associated with one or more application portfolio management operations.

Figure 4:
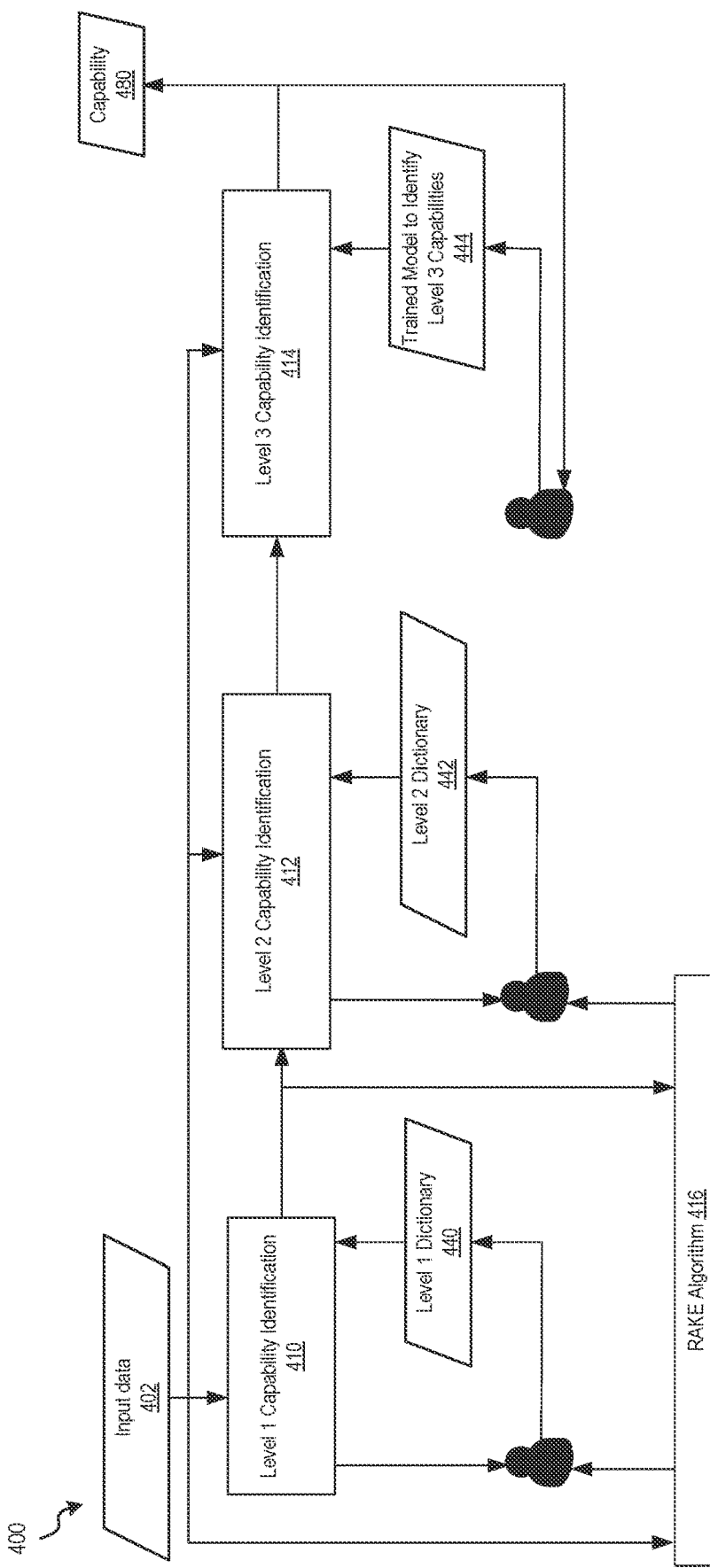
FIG. 4 is a flow diagram illustrating an example of a method for a capability identification according to one or more aspects.

Referring to FIG. 4, an example of a method 400 for a capability identification according to one or more aspects. The method 400 may be performed by the server 102, the processor 104, the data cleanse engine 110, or a combination thereof.

The method 400 includes receiving input data 402. The input data 402 may include or correspond to the client information 128, the constraints 130, the parameters 132, the client data 144, the input 170, the application documents received at 302, the financial descriptions received at 304, the previous assessment descriptions received at 306, or a combination thereof. In some implementations, the input data 402 may include or correspond to a description of an application.

The method 400 includes performing a first capability identification at 410. The first capability identification may be performed based on the input data 402, a first dictionary 440, or a combination thereof. The first dictionary 440 may be associated with an industry of one or more applications. In some implementations, the first capability identification is a level 1 capability identification, the first dictionary 440 is a level one contextual dictionary, or a combination thereof. Additionally, or alternatively, the first capability identification may contextualize the input data 402 based on an industry. For example, the input data 402 may be broken up across multiple dimensions associated with the industry and the first dictionary 440 may be used that includes a corpus specific to the industry.

The method 400 includes performing a second capability identification at 412. The second capability identification may be performed based on the input data 402, a second dictionary 442, a result of the first capability identification, or a combination thereof. The second dictionary 442 may be associated with the industry of one or more applications. In some implementations, the second capability identification is a level 2 capability identification, the second dictionary 442 is a level 2 contextual dictionary, or a combination thereof. Additionally, or alternatively, the second capability identification may contextualize the input data 402 or a result of the first capability identification based on an industry. For example, the input data 402 or the result of the first capability identification may be broken up across multiple dimensions associated with the industry and the second dictionary 442 may be used that includes a corpus specific to the industry The method 400 includes performing a third capability identification at 414. The third capability identification may be performed based on the input data 402, a trained model to identify a capability 443, a result of the first capability identification, a result of the second capability identification, or a combination thereof. The trained model to identify a capability 443 may include or correspond to the ML model 112, may be associated with the industry of one or more applications, or a combination thereof. In some implementations, the trained model to identify the capability 443 is a model trained to identify a level 3 capability. The third capability identification may output a capability 480, such as a capability associated with an application.

In some implementations, the method 400 may use a rapid automatic keyword extraction (RAKE) algorithm at 416. The RAKE algorithm may be used to improve or grow the first dictionary 440, the second dictionary 442, or a combination thereof. For example, the RAKE algorithm may be applied to the input data, the result of the first capability identification, a result of the second capability identification, or a combination thereof. One or more operations associated with the RAKE algorithm are described further herein at least with reference to FIG. 5. An output of the RAKE algorithm may be provided to a user, such as a user of user device 150. The user may validate the result of the RAKE, and the validation may be provided as feedback to the first dictionary 440, the second dictionary, or a combination thereof to improve the future results. Additionally, or alternatively, the capability 480 may be provided to the user and the user may validate the output which is provided as an input to further train the model to identify the capability 480 and improve future results.

As described with reference to the method 400, multiple states of filtering the input data 402 are provided. The filtering is performed using industry specific dictionaries, such as industry specific contextual dictionaries, to determine the capability 480 is contextualized for an industry associated with the input data 402.

Figure 5:
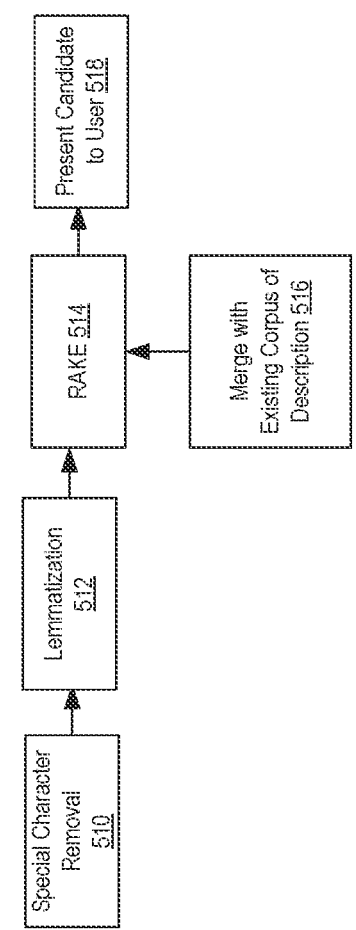
FIG. 5 is a flow diagram illustrating an example of a method for identifying a candidate for inclusion in a dictionary according to one or more aspects.

Referring to FIG. 5, an example of a method 500 for identifying a candidate for inclusion in a dictionary according to one or more aspects. The method 500 may be performed by the server 102, the processor 104, the data cleanse engine 110, or a combination thereof.

The method 500 may include receiving an input, such as the input data 402, a result of the first capability identification, or a combination thereof. The method 500 includes performing special character removal of the input at 510. The method further includes performing lemmatization at 512.

The method 500 includes performing the RAKE algorithm at 514. The RAKE algorithm may include or correspond to the RAKE algorithm of FIG. 4. In some implementations, the RAKE algorithm may be performed based on or in view of an existing corpus associated with a description of one or more applications. The corpus may include or correspond to the first dictionary 440, the second dictionary 442, or a combination thereof.

In some implementations, the performance of the RAKE algorithm may extract one or more potential keywords using RAKE. A word co-occurrence table may be created between different words provided to the RAKE algorithm. Based on the co-occurrence table, a degree of a word may be calculated as:

$$\Sigma(\text{Word}_n)$$

Additionally, a degree score of the word is calculated as:

$$\frac{\sum \text{Word}_n}{F(\text{Word}_n)}$$

where F is the frequency count of the word. Based on the degree score for the words provided to the RAKE algorithm, one or more words may be identified as candidate terms. For example, words corresponding to the top 10 degree scores may be identified as the candidate terms for validation and possible insertion into a dictionary.

The method 500 includes presenting one or more candidate terms or phrases to a user. For example, the one or more candidate terms may be presented to a user of user device 150 as described with reference to FIG. 4. The user may validate the result of the RAKE, and the validation may be provided as feedback to the first dictionary 440, the second dictionary, or a combination thereof to improve the future results—e.g., future results of the first capability identification, the second capability identification, or a combination thereof.

Figure 6:
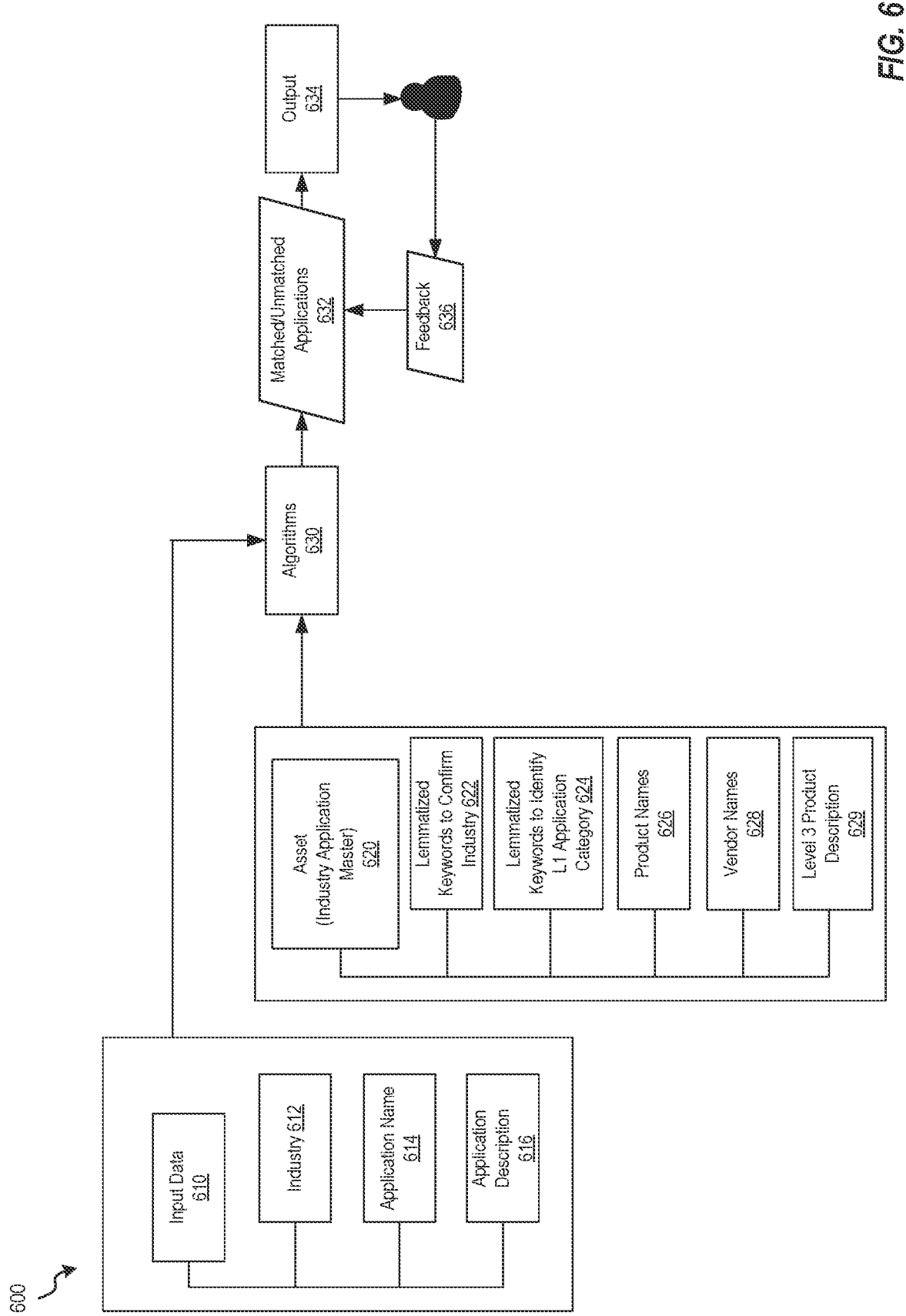
FIG. 6 is a flow diagram illustrating a first example of a method for matching an application according to one or more aspects.

Referring to FIG. 6, an example of a first example of a method 600 for matching an application according to one or more aspects. The method 600 may be performed by the server 102, the processor 104, the functional assessment engine 116, or a combination thereof.

The method 600 may include receiving or identifying input data 610. The input data 610 may include or correspond to the clean data 114, the client information 128, the constraints 130, the parameters 132, the client data 144, the input 170, the application documents received at 302, the financial descriptions received at 304, the previous assessment descriptions received at 306, the input data 402, or a combination thereof. In some implementations, the input data 610 may include or correspond to clean data 114. The input data 610 may be associated with a set of applications. The input data 610 may include or indicate an industry 612, an application name 614, an application description 616, or a combination thereof. The input data 610 may be input by an entity, such as an entity associated with client device 140.

The method 600 may include receiving or identifying asset data 620. In some implementations, asset data 620 may include or correspond to the industry 612. The asset data 620, such as industry application master data, may include or correspond to program information 162, historical information 164, first contextual dictionary 320, mth contextual dictionary 322, first dictionary 440, second dictionary 442, corpus 516, or a combination thereof. The asset data 620 may include or indicate lemmatized keywords to confirm an industry 622, lemmatized keywords to identify an application category 624 (e.g., a level 1 application category), a product name 626 (e.g., an application), a vendor name 628, a product description 629 (e.g., a level 3 product description or classification), or a combination thereof.

The method 600 may include performing an algorithm at 630. In some implementations, the algorithm may include, correspond to, or use the ML model 118. The algorithm may be performed to match the input data 610 with the asset data 620 such that one or more matched/unmatched applications 632 are identified. One or more operations of the algorithm are described further herein at least with reference to FIG. 7.

The method 600 may include providing an output 634 that includes or indicates the one or more matched/unmatched applications 632. The output 634 may include or correspond to the output 180. The output 634 may be provided to a user, such as a user of the client device 140, a user of the user device 150, or a combination thereof. Feedback 363 may be received from the user. The feedback 636 may include or correspond to the feedback 182 from the client device 140 or the feedback 184 from the user device 150. The feedback 636 may provide additional information, such as one or more parameters 132, about a matched application or an unmatched application. Additionally, or alternatively, the feedback 636 may confirm or a matched application or an unmatched application.

Figure 7:
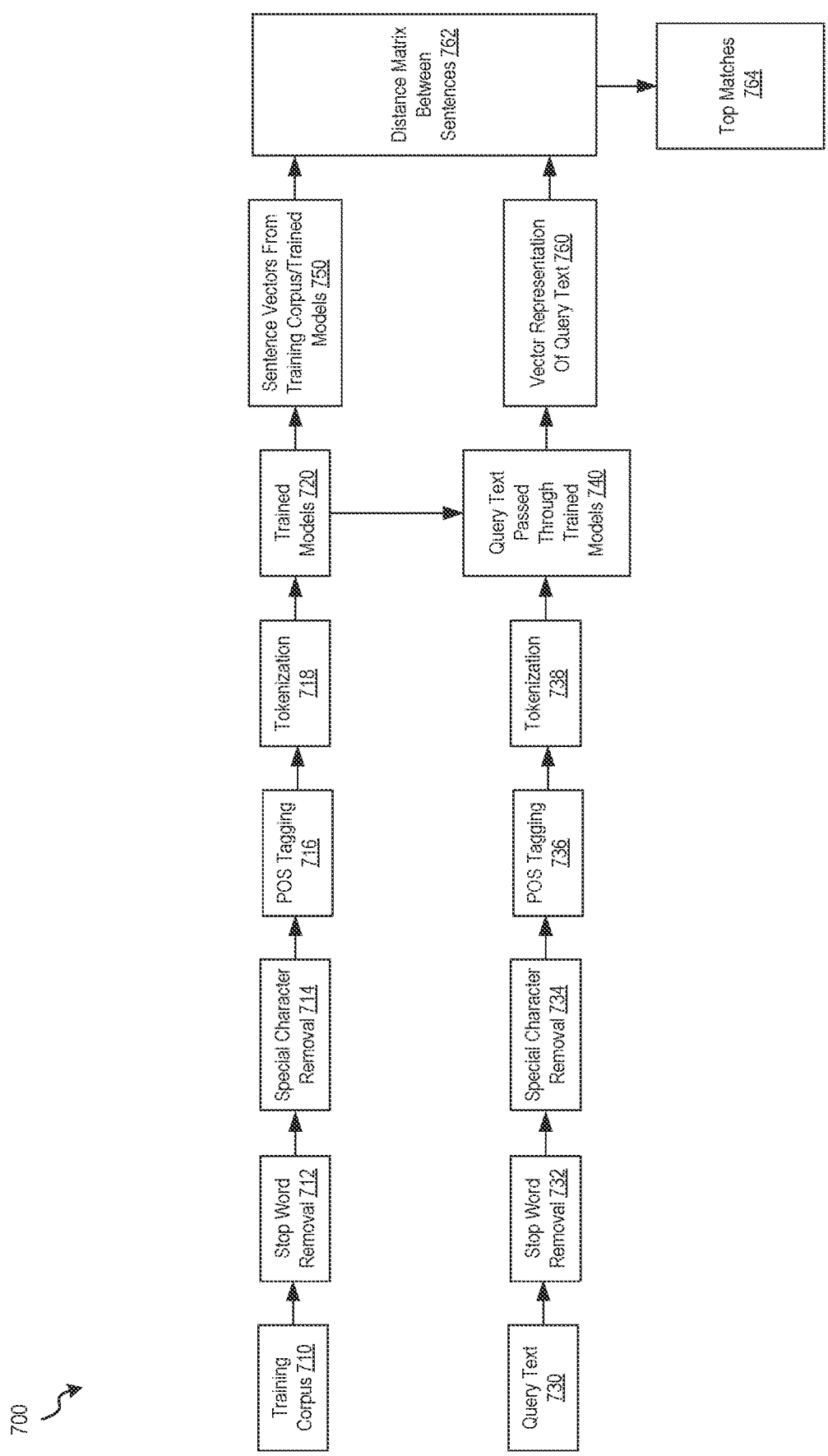
FIG. 7 is a flow diagram illustrating a second example of a method for matching an application according to one or more aspects.

Referring to FIG. 7, an example of a second example of a method 700 for matching an application according to one or more aspects. The method 700 may be performed by the server 102, the processor 104, the functional assessment engine 116, or a combination thereof. In some implementations, the method 700 may include or correspond to performing algorithm at 630 of FIG. 6.

The method 700 includes receiving a training corpus at 710. The training corpus may include or correspond to program information 162, historical information 164, or a combination thereof. The method 700 includes performing stop work removal at 712, performing special character removal at 714, performing parts of speech (POS) tagging at 716, and performing tokenization at 718. The method 700 further includes training one or more models at 720. The one or more models may include or correspond to ML model 118. In some implementations, the one or more models include multiple models, such as three trained models. The multiple models may include multiple matching algorithms. Additionally, the method 700 includes generating one or more sentence vectors from the training corpus/trained models at 750.

The method 700 includes receiving query text at 730. The query text may include or correspond to the clean data 114, the client information 128, the constraints 130, the parameters 132, the client data 144, the input 170, the application documents received at 302, the financial descriptions received at 304, the previous assessment descriptions received at 306, the input data 402, the input data 610, or a combination thereof. The method 700 includes performing stop work removal at 732, performing special character removal at 734, performing POS tagging at 736, and performing tokenization at 738. In some implementations, the stop word removal, the special character removal, the POS tagging, or a combination thereof, may include or correspond to a cleanse operation performed by or using the data cleanse engine 110.

The method 700 includes passing the query text (e.g., the processed query text) through the trained model (of 720). A vector representation of the query text is generated at 760. At 762, a distance matrix is generated between the sentence vectors. The top matches are identified at 764. An example of the multiple matching algorithms, and identifying the top matches is described further herein at least with reference to FIG. 8.

Figure 8:
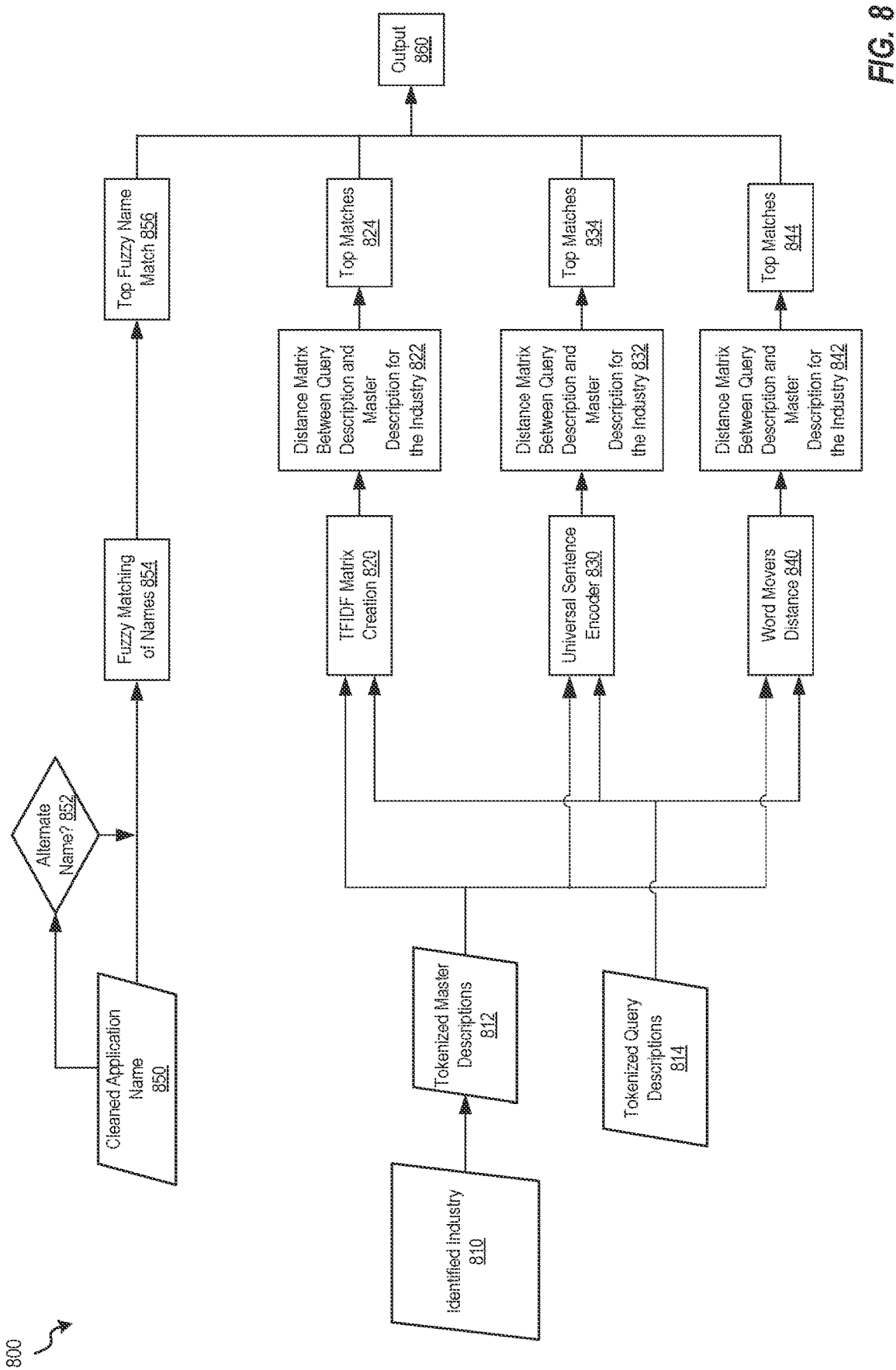
FIG. 8 is a flow diagram illustrating a third example of a method for matching an application according to one or more aspects.

Referring to FIG. 8, an example of a third example of a method 800 for matching an application according to one or more aspects. The method 800 may be performed by the server 102, the processor 104, the functional assessment engine 116, or a combination thereof. In some implementations, the method 800 may include or correspond to one or more operations as described with reference to of FIG. 7.

The method 800 includes, at 850, identifying a cleaned application name. The cleaned application may include or correspond to the clean data 114, the clean/normalized text at 334, the application name 614, or a combination thereof. At 852, the method 800 determines whether the application name has any alternate names. If so, the alternate names are added to the cleaned application name. At 854, a fuzzy matching is performed using names from the master as well as names from the user input. At 856, one or more top matches are identified. In some implementations, the three top matches are identified.

The method 800 includes identifying an industry associated with a set of applications at 810. Based on the identified industry, a set of tokenized master descriptions is identified at 812. The tokenized master descriptions may include or correspond to an output of the tokenization at 718. Additionally, a set of tokenized query descriptions is identified at 814. The tokenized query descriptions may include or correspond to an output of the tokenization at 738.

The method 800 includes, for each industry identified at 810, performing one or more algorithms. As shown, the one or more algorithms include three algorithms. The three algorithms may be run in parallel.

At 820, a first algorithm includes a term frequency inverse document frequency (TFIDF) algorithm configured to generate a TFIDF matrix. At 822, a distance matrix between the query descriptions (e.g., 814) and the master descriptions (e.g., 812) is generated. At 824, one or more top matches are identified. In some implementations, the three top matches are identified.

At 830, a second algorithm includes a universal sentence encoders algorithm and each sentence is converted into a vector. In some implementations, sentences may be encoded using a TensorFlow sentence encoder. At 832, a distance matrix between the query descriptions (e.g., 814) and the master descriptions (e.g., 812) is generated. In some implementations, the cosine distances are calculated as:

$$\text{Similarity} = \frac{A.B}{\|A\|\|B\|}$$

Where A is a first vector and B is a second vector. At 824, one or more top matches are identified. In some implementations, the three top matches are identified.

At 840, a third algorithm includes a word mover distance in which words are vectorized first using word to vectorization. At 842, a distance matrix between the query descriptions (e.g., 814) and the master descriptions (e.g., 812) is generated. It is noted that a distance between descriptions may be calculated as the shortest cumulative distance that words from one text document must travel to exactly match the point cloud of another text document. At 844, one or more top matches are identified. In some implementations, the three top matches are identified.

In some implementations, with respect to one or more of the distance matrixes generated at 822, 832, 842, the distances will have their skews, and the skew in the score is normalized as follows:

$$D_c = \text{Median}(Sc)$$

$$Sk_c = (Sc_{max} - Sc_{min})/2$$

$$\text{Shift} = Sk_c - D_c$$

$$\text{scale}_{factor_{min}=(Sk_c+Shift-Sc_{min})} \over Sk_c - Sc_{min}$$

$$\text{scale}_{factor_{min}=(Sk_c-Sc_{min})} \over Sc_{max} - Sk_c + \text{Shift}$$

$$f(Sc_n) = \begin{cases} Sc_i & Sc_i * \text{Scale}_{factor_{min} \text{ if } Sc_i} \geq D_c \\ Sc_i & Sc_i * \text{Scale}_{factor_{max} \text{ if } Sc_i} < D_c \end{cases}$$

The scores for each algorithm (e.g., the TFIDF, the universal sentence encoder, and the word movers distance) may be normalized using standard z-scores, such as:

$$Z = \frac{(Sc - \mu^{Sc})}{n} \sigma^{Sc}$$

where Sc is the scores from each algorithm, $Sc_{max}$ is the max value of score in the series, $Sc_{min}$ is the minimum value of score in the series, $M^{Sc}$ is the mean of the scores, $\Sigma^{Sc}$ is the standard deviation of scores, and $f(Sc_n)$ is the transformation function. Accordingly, scores across the three algorithms are comparable.

The top matches (e.g., 824, 834, 844, 856) may be output at 860. In some implementations, the normalized scores of the top three matches (e.g., 824, 834, 844, 856) from each algorithm (e.g., the fuzzy matching,) are put to a weighted vote. The results with the highest cumulative voted scores may be presented as the output at 860.

Figure 9:
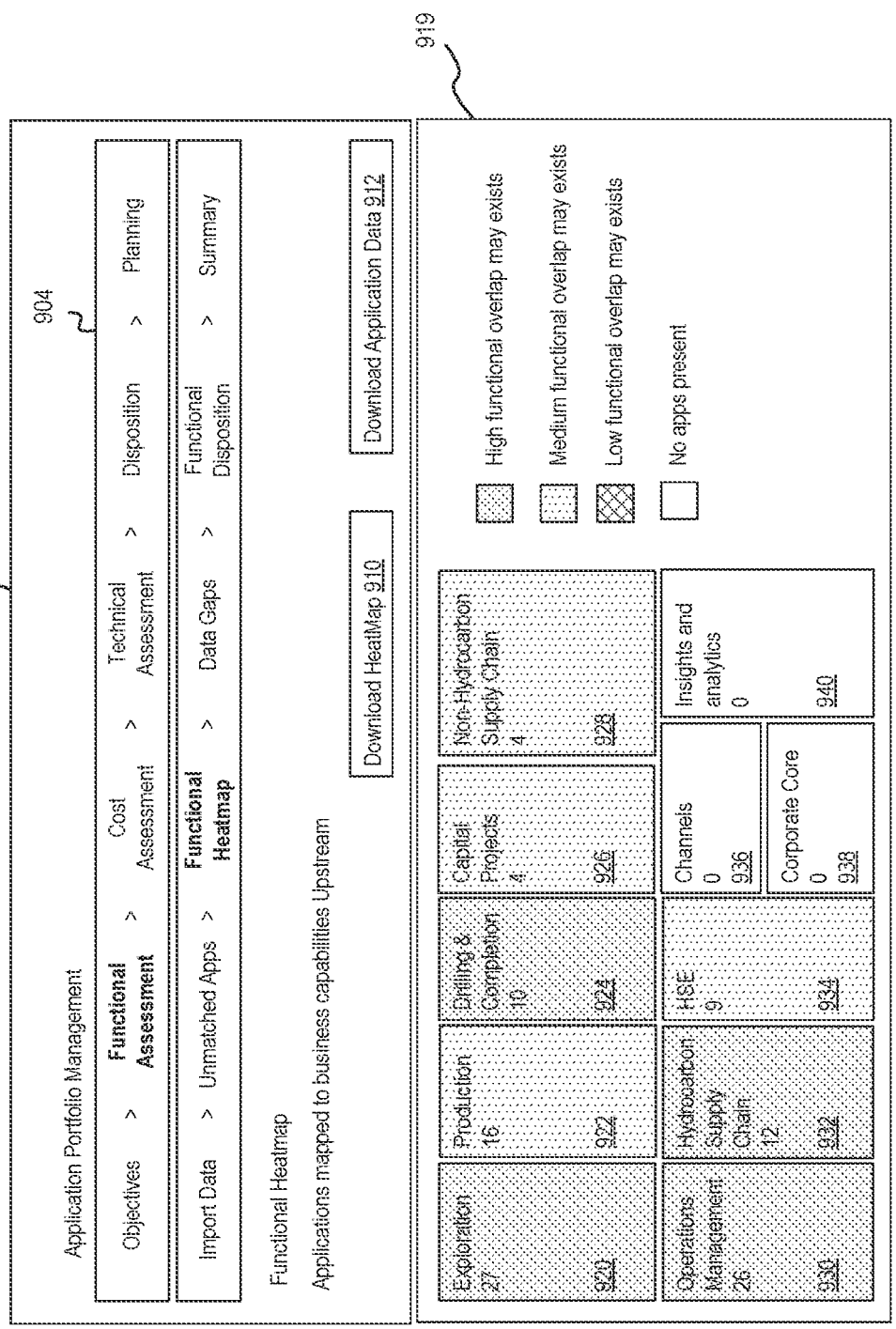
FIG. 9 is a diagram of an example of a heatmap according to one or more aspects.

Referring to FIG. 9, an example of a heatmap 900 according to one or more aspects. The heatmap may include or correspond to the output 180. In some implementations, the heatmap may be presented via graphical user interface (GUI).

The heatmap 900 includes a first window 902 and a second window 919. The first window includes one or more status bars 904. The status bars indicates a status of an application portfolio management process, such as the process 200. As shown in the heatmap 900, the status bars 904 indicate that the application portfolio management process is at a functional assessment stage and, within the functional assessment stage, is at a functional heatmap stage. The first window also includes one or more options, such as a download heatmap option 910 and a download application data option 912.

The second window 919 includes a representation of the heatmap The representation includes multiple categories, such as an exploration category 920, a production category 922, a drilling & completion category 924, a capital projects category 926, a non-hydrocarbon supply chain category 928, an operations management category 930, a hydrocarbon supply chain category 932, an HSE category 934, a channels category 936, a corporate core category 938, and an insights and analytics category 940. Each category indicates a number of applications of a set of applications that have overlapping features. Based on the number of applications that are overlapping for a category, the category is shaded to indicate a high functional overlap may exist, a medium functional overlap may exist, a low functional overlap may exist, or no applications are present.

Figure 10:
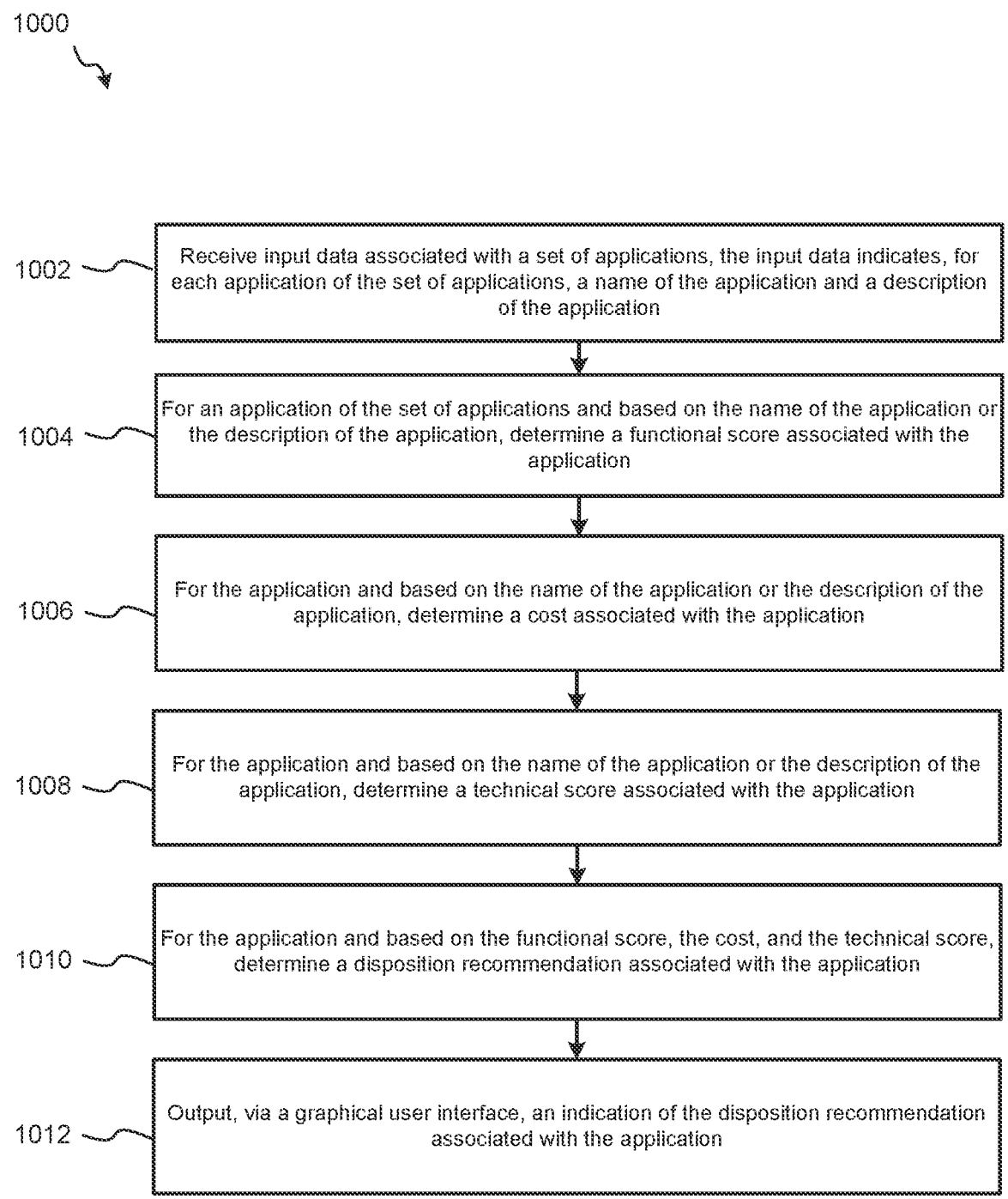
FIG. 10 is a flow diagram illustrating an example of a method for application portfolio management according to one or more aspects.

Referring to FIG. 10, an example of a method 1000 for application portfolio management according to one or more aspects is shown. In some implementations, the operations of the method 1000 may be stored as instructions that, when executed by one or more processors (e.g., the one or more processors of a computing device or a server), cause the one or more processors to perform the operations of the method 1000. In some implementations, the method 1000 may be performed by a computing device, such as the server 102 of FIG. 1.

The method 1000 includes receiving input data associated with a set of applications, at 1002. The input data may be received by the server 102, the processor 104, the memory 106, the data cleanse engine, client information 128, or a combination thereof. The input data indicates, for each application of the set of applications, a name of the application and a description of the application. The set of applications, such as one or more computer programs or software items, may include or correspond to an individual, a group, a department, a company, an organization, or an entity, as illustrative, non-limiting example. Each application of the set of applications may be associated with a set of parameters, such as the parameters 132. For each application of the set of applications, the set of parameters may include a name of the application, a description, a type, a status, a technical stack, a critically, a number of tickets, a language, or a combination thereof.

The input data may include or correspond to the input 170, the client data 144, the feedback 182, the input documents application descriptions 302, the input documents financial descriptions 304, the input documents previous assessment descriptions 306, input data 610, industry 612, application name 614, application description 616, query text 730, cleaned application name 850, or a combination thereof. Additionally, or alternatively, the input data may include, indicate, or be associated with one or more constraints. For example, the one or more constraints may include or indicate a skill, a budget, a platform preference, a hosting preference, a technical debt reduction target, a portfolio size target, or a combination thereof. In some implementations, the input data may indicate, for at least one application of the set of applications, a set of parameters. For an application, the set of parameters may include or indicate a name of the application, a description of the application, a type of the application, an application status, a technology stack, a criticality, a number of tickets, or a combination thereof.

The method 1000 includes determining, for an application of the set of applications and based on the name of the application or the description of the application, a functional score associated with the application, at 1004. For example, the functional score may be determined by the server 102, the processor 104, the functional assessment engine 116, or a combination thereof. In some implementations, for each application of the set of applications, the functional score associated with the application may be determined based on the set of parameters associated with the application. Additionally, or alternatively, for each application of the set of applications, the functional score associated with the application may be determined based on a strategic fit of the application, a functional adequacy of the application, a future potential of the application, or a combination thereof.

The method 1000 includes determining, for the application and based on the name of the application or the description of the application, a cost associated with the application, at 1006. For example, the cost may be determined by the server 102, the processor 104, the cost engine 120, or a combination thereof. In some implementations, the cost of the application may be determined by selecting one or more calculation processes from multiple calculation processes and, for each of the one or more calculations processes, determining a candidate cost. The cost of the application may be determined by aggregating the determined one or more candidate costs of the one or more calculation processes. Additionally, or alternatively, for each application of the set of applications, the cost associated with the application may include a cloud cost, a labor cost, an infrastructure cost, a license cost, or a combination thereof.

The method 1000 includes determining, for the application and based on the name of the application or the description of the application, a technical score associated with the application, at 1008. For example, the technical score may be determined by the server 102, the processor 104, the technical engine 122, or a combination thereof. In some implementations, for each application of the set of applications, the technical score may be determined based on the set of parameters associated with the application. Additionally, or alternatively, for each application of the set of applications, the technical score associated with the application is determined based on a type, a technical risk, a cloud readiness, a technical adequacy, an operating system, or a combination thereof.

The method 1000 includes determining, for the application and based on the functional score, the cost, and the technical score, a disposition recommendation associated with the application, at 1010. For example, the disposition recommendation may be determined by the server 102, the processor 104, the recommendation engine 124, or a combination thereof. For each application of the set of applications, the disposition recommendation may include one of retire, retain, consolidate, replace, rehost, re-platform, or repackage/rearchitect.

The method 1000 includes outputting, via a graphical user interface, an indication of the disposition recommendation associated with the application, at 1012. The indication, the disposition recommendation, or a combination thereof, may include or correspond to the output 180.

In some implementations, the method 1000 may include receiving, for at least one application of the set of applications, recommendation feedback associated with the disposition recommendation of the at least one application. The recommendation feedback may include or correspond to the feedback 182. Based on the recommendation feedback, an updated disposition recommendation associated with the at least one application may be generated. For example, the updated disposition recommendation may be generated using the recommendation engine 124. The method 1000 may include outputting an indication of the updated disposition recommendation associated with the at least one application. The indication may include or correspond to the output 180.

In some implementations, the method 1000 may include generating, based on the disposition recommendation or the updated disposition recommendation associated with the application, a plan for implementing the disposition recommendations. For example, the plan may be determined by the server 102, the processor 104, the planning engine 126, or a combination thereof.

In some implementations, the method 1000 may include cleaning, using the one or more ML models, the input data to generate clean input data. For example, the clean input data may be generated by the server 102, the processor 104, the data cleanse engine 110, or a combination thereof. The clean data may include or correspond to the clean data 114 or clean/normalized text 334. In some implementations, the clean data may be generated based on the input data and one or more ML models. For example, the one or more ML models may be selected from a plurality of ML models. The one or more ML models may be selected from the plurality of ML models based on an industry associated with the set of application, an entity, or a combination thereof. In some implementations, the input data indicates the industry. Additionally, or alternatively, each ML model of the one or more ML models or of the plurality of ML models may be trained to recognize and standardize company names, cost labels, and capability keywords, or a combination thereof. In some implementations, for at least one application of the set of applications. the functional score associated with the at least one application, the cost associated with the at least one application, the technical score associated with the at least one application, or a combination thereof, is determined based on the clean input data.

In some implementations, to generate the clean data, the method 1000 may include performing one or more matching operations based on the input data and a context dictionary associated with an industry. For example, context dictionary may include or correspond to one or more contextual dictionaries, such the contextual dictionary_1 320 or the contextual dictionary_n 322. The matching operation may identify one or more clusters. The one or more clusters may include or correspond to the morphological clusters 330. The clean input data may be generated based on the one or more clusters. Based on the clean input data and a machine learning (ML) model trained to recognize entities, cost labels, capability keywords, or a combination thereof, one or more entities may be identified. For example, the one or more entities may include or indicate a vendor name, a capability, a cost, a disposition, or a combination thereof. The ML model may include or correspond to the ML model 112, the pre-trained DNN for entity recognition 342, or a combination thereof.

In some implementations, for each application of the set of applications, mapping the application may be mapped to a capability of a set of capabilities associated with an industry. For example, the application may be mapped by the server 102, the processor 104, the cost engine 120, or a combination thereof. The method 1000 may include generating heatmap data based on the set of applications mapped to the set of capabilities The heat map data may include or correspond to the heatmap 900. The heatmap data may indicate, for each capability of the set of capabilities, a number of applications of the set of applications associated with the capability. A representation of the heatmap data may be output. For example, the representation, the heatmap data, or a combination thereof may be include in or indicated by the output 180. In some implementations, the disposition recommendation may be determined based on the heatmap data.

In some implementations, the method 1000 may include determining, for each application of the set of applications, whether or not the application is mappable to a capability of a set of capabilities associated with the industry. For at least one application of the set of applications that is determined to be unmappable, the method 1000 may request additional information associated with the at least one application. For example, the additional information may be requested from a user associated with client device 140, a user associated with user device 150, or a combination thereof.

As described above, the method 1000 supports application portfolio management. For example, one or more disposition recommendations may be generated for a set of applications.

It is noted that other types of devices and functionality may be provided according to aspects of the present disclosure and discussion of specific devices and functionality herein have been provided for purposes of illustration, rather than by way of limitation. It is noted that the operations of the method 1000 of FIG. 10 may be performed in any order, or that operations of one method may be performed during performance of another method, such as one or more operations described with reference to the system 100 of FIG. 1, the method or process 200 of FIG. 2, or a combination thereof. It is also noted that the method 1000 of FIG. 10 may also include other functionality or operations consistent with the description of the operations of one or more of FIGS. 3-9.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, engines, and the modules described herein with respect to FIGS. 1-10 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically: two items that are "coupled" may be unitary with each other, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for application portfolio management performed by one or more processors, the method comprising:
   receiving input data associated with a set of applications, the input data indicates, for each application of the set of applications, a name of the application and a description of the application; and
   for each application of the set of applications:
      based on the name of the application or the description of the application:
         determining a functional score associated with the application;
         determining a cost associated with the application; and
         determining a technical score associated with the application; and
      based on the functional score associated with the application, the cost associated with the application, and the technical score associated with the application, determining a disposition recommendation associated with the application; and
      outputting, via a graphical user interface, an indication of the disposition recommendation associated with the application.

2. The method of claim 1, wherein:
   the input data is further associated with a set of constraints;

the set of constraints include a skill, a budget, a platform preference, a hosting preference, a technical debt reduction target, a portfolio size target, or a combination thereof; and the input data indicates, for each application of the set of applications, a set of parameters that includes the name of the application, the description of the application, a type of the application, an application status, a technology stack, a criticality, a number of tickets, or a combination thereof.

3. The method of claim 1, further comprising:

selecting, based on an industry, one or more machine learning (ML) models of a plurality of ML models, each ML model of the one or more ML models trained to recognize and standardize company names, cost labels, and capability keywords, or a combination thereof, wherein the input data indicates the industry; and cleaning, using the one or more ML models, the input data to generate clean input data; and wherein, for at least one application of the set of applications, the functional score associated with the at least one application, the cost associated with the at least one application, the technical score associated with the at least one application, or a combination thereof, is determined based on the clean input data.

4. The method of claim 1, further comprising:

performing one or more matching operations based on the input data and a context dictionary associated with an industry;

generating one or more clusters based on the one or more matching operations;

generating clean input data based on the one or more clusters; and determining, based on the clean input data and a machine learning (ML) model trained to recognize entities, cost labels, capability keywords, or a combination thereof, one or more entities, the one or more entities including a vendor name, a capability, a cost, a disposition, or a combination thereof.

5. The method claim 1, further comprising:

for each application of the set of applications, mapping the application to a capability of a set of capabilities associated with an industry;

generating heatmap data based on the set of applications mapped to the set of capabilities, the heatmap data indicating, for each capability of the set of capabilities, a number of applications of the set of applications associated with the capability; and output a representation of the heatmap data.

6. The method of claim 5, wherein the disposition recommendation is further determined based on the heatmap data.

7. The method claim 1, further comprising:

for each application of the set of applications, determining whether or not the application is mappable to a capability of a set of capabilities associated with an industry; and for at least one application of the set of applications that is determined to be unmappable, requesting additional information associated with the at least one application.

8. A system for application portfolio management, the system comprising:

a memory; and one or more processors communicatively coupled to the memory, the one or more processors configured to:

receive input data associated with a set of applications, the input data indicates, for each application of the set of applications, a name of the application and a description of the application; and for each application of the set of applications:

based on the name of the application or the description of the application:

determine a functional score associated with the application;

determine a cost associated with the application; and determine a technical score associated with the application; and based on the functional score associated with the application, the cost associated with the application, and the technical score associated with the application, determine a disposition recommendation associated with the application; and output, via a graphical user interface, an indication of the disposition recommendation associated with the application.

9. The system of claim 8, wherein each application of the set of applications is associated with a set of parameters.

10. The system of claim 8, wherein, for each application of the set of applications, the set of parameters includes the name, the description, a type, a status, a technical stack, a critically, a number of tickets, a language, or a combination thereof.

11. The system of claim 8, wherein, for each application of the set of applications, the functional score associated with the application is determined based on the set of parameters.

12. The system of claim 11, wherein, for each application of the set of applications, the functional score associated with the application is determined based on a strategic fit of the application, a functional adequacy of the application, a future potential of the application, or a combination thereof.

13. The system of claim 9, wherein, for each application of the set of applications, the technical score associated with the application is determined based on the set of parameters.

14. The system of claim 13, wherein, for each application of the set of applications, the technical score associated with the application is determined based on a type, a technical risk, a cloud readiness, a technical adequacy, an operating system, or a combination thereof.

15. The system of claim 8, wherein, for each application of the set of applications, the cost associated with the application includes a cloud cost, a labor cost, an infrastructure cost, a license cost, or a combination thereof.

16. A non-transitory computer-readable storage medium storing instructions that, when executed by one or more processors, cause the one or more processors to perform operations for application portfolio management, the operations comprising:

receiving input data associated with a set of applications, the input data indicates, for each application of the set of applications, a name of the application and a description of the application; and for each application of the set of applications:

based on the name of the application or the description of the application:

determining a functional score associated with the application;

determining a cost associated with the application; and determining a technical score associated with the application; and based on the functional score associated with the application, the cost associated with the application, and the technical score associated with the application, determining a disposition recommendation associated with the application; and outputting, via a graphical user interface, an indication of the disposition recommendation associated with the application.

17. The non-transitory computer-readable storage medium of claim 16, the operations further comprising, for each application of the set of applications;

selecting one or more calculation processes from multiple calculation processes;

for each of the one or more calculations processes, determining a candidate cost; and aggregating the determined one or more candidate costs of the one or more calculation processes to determine the cost of the application.

18. The non-transitory computer-readable storage medium of claim 16, wherein, for each application of the set of applications, the disposition recommendation includes one of retire, retain, consolidate, replace, rehost, re-platform, or repackage/rearchitect.

19. The non-transitory computer-readable storage medium of claim 16, the operations further comprising:

receiving, for at least one application of the set of applications, recommendation feedback associated with the disposition recommendation associated with the at least one application;

generating, based on the recommendation feedback, an updated disposition recommendation associated with the at least one application; and outputting an indication of the updated disposition recommendation associated with the at least one application.

20. The non-transitory computer-readable storage medium of claim 16, the operations further comprising:

generating, based on the disposition recommendations associated with the set of applications, a plan for implementing the disposition recommendations.

* * * * *